(12) United States Patent
Ko et al.

(10) Patent No.: US 8,665,322 B2
(45) Date of Patent: Mar. 4, 2014

(54) SHUTTER GLASSES AND METHOD FOR CONTROLLING A PAIR OF SHUTTER GLASSES

(75) Inventors: Chueh-Pin Ko, New Taipei (TW); Wei-Heng Huang, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 504 days.

(21) Appl. No.: 13/077,994

(22) Filed: Apr. 1, 2011

(65) Prior Publication Data

US 2012/0019637 A1 Jan. 26, 2012

(30) Foreign Application Priority Data

Jul. 23, 2010 (TW) .............................. 99124293 A

(51) Int. Cl.
*H04N 13/04* (2006.01)
(52) U.S. Cl.
USPC .............................................. 348/56; 348/43
(58) Field of Classification Search
USPC ..................................................... 348/43, 56
See application file for complete search history.

(56) References Cited

U.S. PATENT DOCUMENTS

| 5,796,373 A | 8/1998 | Ming-Yen |
| 5,821,989 A | 10/1998 | Lazzaro |
| 6,314,248 B1 | 11/2001 | Ohmura |
| 2007/0229487 A1 | 10/2007 | Slavenburg |
| 2009/0251531 A1 | 10/2009 | Marshall |
| 2010/0066816 A1 | 3/2010 | Kane |
| 2011/0216252 A1* | 9/2011 | MacNaughton et al. ....... 349/15 |

FOREIGN PATENT DOCUMENTS

| TW | 560665 | 11/2003 |
| TW | I266077 | 11/2006 |
| TW | 200819788 | 5/2008 |
| WO | 2007126904 A2 | 11/2007 |
| WO | 2007126904 A3 | 11/2007 |
| WO | 2009069026 A2 | 6/2009 |
| WO | 2009069026 A3 | 6/2009 |
| WO | WO 2009069026 A2 * | 6/2009 |

* cited by examiner

*Primary Examiner* — Sath V Perungavoor
*Assistant Examiner* — Jeffrey Williams
(74) *Attorney, Agent, or Firm* — Winston Hsu; Scott Margo

(57) ABSTRACT

A method for controlling shutter glasses is utilized for viewing stereo images. A video output apparatus respectively outputs a first image and a second image during a plurality of image output periods, alternately. Each image output period includes an image driving period and an image stabilization period. The method includes controlling each of a first shutter lens and a second shutter lens to be switched between an on-state and an off-state. The first shutter lens stays in the on-state within image stabilization periods respectively corresponding to two successive first images, and is switched from the off-state to the on-state and then switched from the on-state to the off-state for at least one time during a time interval between the image stabilization periods respectively corresponding to the two successive first images.

20 Claims, 16 Drawing Sheets

SHUTTER GLASSES AND METHOD FOR CONTROLLING A PAIR OF SHUTTER GLASSES

BACKGROUND OF THE INVENTION

1. Field of the Invention

The present invention relates to a technique of viewing stereo images, and more particularly, to a pair of shutter glasses utilized for viewing stereo images presented by a video output apparatus and a method for controlling the pair of shutter glasses.

2. Description of the Prior Art

With the development of science and technology, users are pursing stereoscopic and more real image displays rather than high quality images. There are two techniques of present stereo image display. One is to use a video output apparatus, which collaborates with glasses (such as anaglyph glasses, polarization glasses or shutter glasses), while the other one is to use only a video output apparatus without any accompanying glasses. No matter which technique is utilized, the main theory of stereo image display is to make the left eye and the right eye see different images, thus the brain will regard the different images seen from two eyes as stereo images.

For a pair of shutter glasses, they are widely used for users to view stereo images presented by a video output apparatus. The pair of shutter glasses comprises two shutter lenses. By the shutter lenses switching properly between an on-state and an off-state, user's left eye is allowed to see left-eye images and user's right eye is allowed to see right-eye images. In general, each shutter lens of the pair of shutter glasses is switched to an on-state and an off-state, alternately. For example, when the shutter lens corresponding to the left eye is in an on-state, the shutter lens corresponding to the right eye is in an off-state, and vice versa. Therefore, the ambient brightness user feels is lower than real ambient brightness. On the other hand, according to the polarized direction of image light output presented by the video output apparatus, the shutter lenses of the pair of shutter glasses have a related polarization setting. However, ambient light comprise light beams of different angles. When the shutter lens of the pair of shutter glasses is in an on-state, only light beams which conform to the polarization setting of the shutter lens will penetrate the shutter lens, and thus the ambient brightness the user feels will also be lower than the real ambient brightness. If the user feels lacking of ambient brightness when wearing the pair of shutter glasses, he/she may not see items (such as a keyboard or remote control) beyond the screen of the video output apparatus clearly, leading to inconvenience in stereo image viewing for users.

Moreover, suppose that a liquid crystal layer is utilized in the shutter lens of the pair of shutter glasses to control the switching between an on-state and an off-state. In general, when there is no voltage applied to the liquid crystal layer, the shutter lens is in an on-state and allows light beams to penetrate therethrough. As is described above, under the control of well known control mechanism, the two shutter lenses of the pair of shutter glasses stay in an on-state alternately. Therefore, when there is no voltage applied to the liquid crystal layer of one shutter lens for allowing light beams to penetrate therethrough, the liquid crystal layer of the other one of shutter lens requires voltage applied thereto for blocking light beams from penetrating therethrough. Thus, if the shutter lens stays in an off-state longer, the power consumption of the pair of shutter glasses is increased.

In conclusion, how to increase the ambient brightness the user feels when wearing pair of shutter glasses and/or decrease power consumption of pair of shutter glasses without affecting user's viewing of stereo images for users is an issue to be solved immediately in this technical field.

SUMMARY OF THE INVENTION

Therefore, one of the objectives of the present invention is to provide a pair of shutter glasses and a method for controlling the pair of shutter glasses, which may lengthen the time period when the shutter lens of the pair of shutter glasses is in an on-state, and further increase the ambient brightness the user feels and/or decrease power consumption of the pair of shutter glasses effectively.

According to a first aspect of the present invention, an exemplary method for controlling a pair of shutter glasses utilized for viewing stereo images presented by a video output apparatus is provided. The video output apparatus respectively outputs a first image and a second image during a plurality of image output periods, alternately. One of the first image and the second image is a left-eye image, and the other one of the first image and the second image is a right-eye image. Each image output period comprises an image driving period and an image stabilization period. The exemplary method comprises: controlling a first shutter lens of the pair of shutter glasses to be switched between an on-state and an off-state, wherein the shutter lens stays in an on-state within two image stabilization periods respectively corresponding to two specific first images, and switch from the off-state to the on-state and switch from the on-state back to the off-state at least once within a first time interval between the two image stabilization periods respectively corresponding to the two specific first images; and controlling a first shutter lens and a second shutter lens of the pair of shutter glasses to be switched between the on-state and the off-state. One of the first shutter lens and the second shutter lens is utilized for viewing left eye images, and the other one of the first shutter lens and the second shutter lens is utilized for viewing right eye images.

According to a second aspect of the present invention, a pair of shutter glasses utilized for viewing stereo images presented by a video output apparatus is provided. The video output apparatus respectively outputs a first image and a second image during a plurality of image output periods, alternately. One of the first image and the second image is a left-eye image, and the other one of the first image and the second image is a right-eye image. Each image output period comprises an image driving period and an image stabilization period. The exemplary pair of shutter glasses comprises: a first shutter lens, a second shutter lens, wherein one of the first shutter lens and the second shutter lens is utilized for viewing left-eye images, and the other one of the first shutter lens and the second lens is utilized for viewing right-eye images; and a control circuit, electronically connected to the first shutter lens and the second shutter lens, in order to control the first shutter lens to be switched between an on-state and an off-state, and control the second shutter lens to be switched between an on-state and an off-state, wherein the control circuit controls the first shutter lens to stay in the on-state within two image stabilization periods corresponding to two successive specific first images, and switch from the off-state to the on-state and switch from the on-state back to the off-state within a first time interval between the two image stabilization periods corresponding to the two first images.

According to a third aspect of the present invention, an exemplary method for controlling a pair of shutter glasses utilized for viewing stereo images presented by a video output apparatus is provided. The video output apparatus outputs a group of first images and a group of second images, alternately, and successively outputs a primary first image and at least a secondary first image included in the group of first images in order, during a successive plurality of first image output periods, respectively, and successively outputs a primary second image and at least a secondary second image included in the group of second images in order, during a successive plurality of second image output periods, respectively. One of the group of first images and the group of second images is a group of left-eye images, and the other of the group of first images and the group of second images is a group of right-eye images. The exemplary method comprises: controlling a first shutter lens of the pair of shutter glasses to be switched between an on-state and an off-state, wherein the shutter lens stays in an on-state within two first image output periods respectively corresponding to two successive specific primary first images, and is switched from the off-state to the on-state and is switched from the on-state to the off-state at least once within a first time interval between the two first images; and controlling a second shutter lens of the pair of shutter glasses to be switched between an on-state and an off-state. One of the first shutter lens and the second shutter lens is utilized for viewing left-eye images, and the other one of the first shutter lens and the second shutter lens is utilized for viewing right-eye images.

According to a fourth aspect of the present invention, the exemplary pair of shutter glasses utilized for viewing stereo images presented by a video output apparatus is provided. The video output apparatus outputs a group of first images and a group of second images, alternately, and successively outputs a primary first image and at least a secondary first image included in the group of first images in order, during a successive plurality of first image output periods, respectively, and successively outputs a primary second image and at least a secondary second image included in the group of second images in order, during a successive plurality of second image output periods, respectively. One of the group of the first images and the group of second images is a group of left-eye images, and the other group of the first images and the group of second images is a group of right-eye images. The exemplary pair of shutter glasses comprises: a first shutter lens, a second shutter lens wherein one of the first shutter lens and the second shutter lens is utilized for viewing left-eye images, and the other one of the first shutter lens and the second shutter lens is utilized for viewing right-eye images; and a control circuit, electronically connected to the first shutter lens and the second shutter lens, in order to control the first shutter lens to be switched between an on-state and an off-state, and control the second shutter lens to be switched between an on-state and an off-state, wherein the control circuit controls the first shutter lens to stay in the on-state within two first image output periods corresponding to two specific secondary first images following two successive specific primary first images, and switch from the off-state to the on-state and switch from the on-state back to the off-state at least once within a first time interval between the two first images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
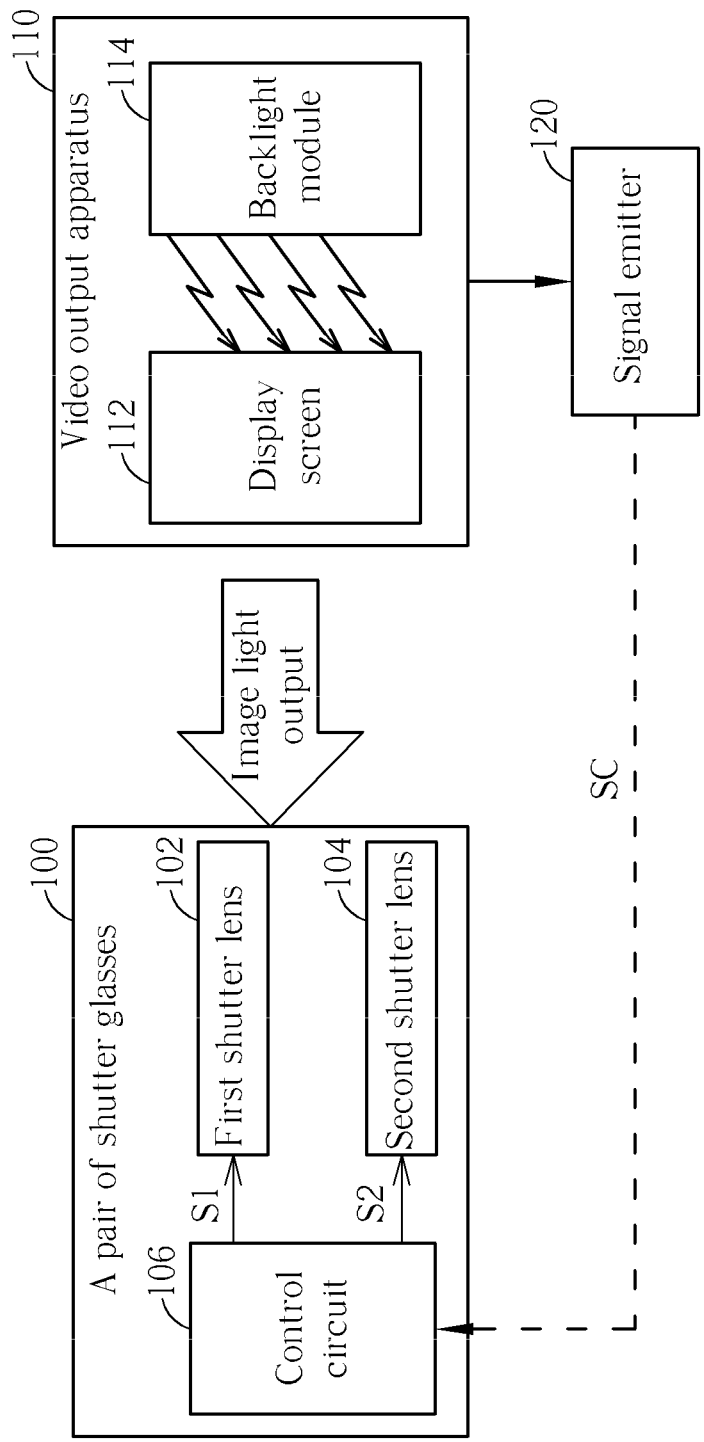
FIG. 1 is a function block diagram of the pair of shutter glasses utilized for viewing stereo images presented by a video output apparatus.

Please refer to FIG. 1, which is a function block diagram of a pair of shutter glasses utilized for viewing stereo images presented by a video output apparatus. In present exemplary embodiment, pair of shutter glasses 100 comprises, but are not limited to, a first shutter lens 102, a second shutter lens 104 and a control circuit 106. One of the first shutter lens 102 and second shutter lens 104 (e.g., the first shutter lens 102) is utilized for viewing left-eye images, and the other one of the first shutter lens 102 and the second shutter lens 104 (e.g., the second shutter lens 104) is utilized for viewing right-eye glasses. Besides, the control circuit 106 respectively outputs control signals S1 and S2 to the first shutter lens 102 and the second shutter lens 104, in order to control the first shutter lens 102 to be switched between an on-state (or called open state) and an off-state (or called close state), and control the second shutter lens 104 to be switched between the on-state and the off-state. For example, the first shutter lens 102 and the second shutter lens 104 have liquid crystal layers, respectively. Therefore, the control signal S1/S2 may be a control voltage utilized for controlling the rotation of the liquid crystal cells (LC cells) in the liquid crystal layer to control light transmission rate. However, this is for illustrative purposes only, and is not meant to be a limitation of the present invention. For example, any structure that may control light transmission rate may be utilized for realizing the first shutter lens 102 and the second shutter lens 104. This also achieves the objective of controlling the first shutter lens 102 and the second shutter lens 104 to be switched between the on-state and the off-state.

In the present invention, the "off-state" described above means that the first shutter lens 102/the second shutter lens 104 is totally opaque (i.e., the light transmission rate is 0%). Therefore, as long as the first shutter lens/the second shutter lens is not totally opaque (i.e., the light transmission rate is not 0%), it may be regarded as staying in the "on-state". For example, when the first shutter lens 102/the second shutter lens 104 is fully open (i.e., the light transmission rate is 100%), half open (i.e., the light transmission rate is 50%), or slightly open (i.e., the light transmission rate is 0.1%), the first shutter lens 102/the second shutter lens 104 may be regarded as staying in an on-state. In brief, when the light transmission rate of the first shutter lens 102/the second shutter lens 104 is larger than 0% (but smaller than or equal to 100%), the first shutter lens 102/the second shutter lens 104 is staying in an on-state.

A user may wear pair of shutter glasses 100 to view stereo images presented by a video output apparatus 100. For example, the video output apparatus 110 may be a liquid crystal display (LCD), and therefore comprises, but is not limited to, a display screen 112 (e.g., an LCD panel) and a backlight module 114. The backlight module 114 provides light source needed by the display screen 112, and pair of shutter glasses 100 controls whether image light output generated by the display screen 112 may reach user's left eye or right eye. Please note that video output apparatus 110 is not limited to the LCD apparatus, that is, the video output apparatus 110 may be any video output apparatus that may collaborate with the pair of shutter glasses 100 for presenting stereo images to the user. For example, the video output apparatus 100 may be an organic light-emitting diode (OLED) display, a plasma display, a digital light processing (DLP) display/projector, a liquid crystal on silicon (LCoS) display/projector, etc.

The pair of shutter glasses 100 may have the first shutter lens 102 and the second shutter lens 104 switched between an on-state and an off-state under the control of the control circuit 106. In this way, the ambient brightness the user feels may be increased and/or the power consumption of the pair of shutter glasses may be decreased without affecting user's viewing of stereo images. Pair of shutter glasses 100 may receive reference information SC from the video output apparatus 110 through wired or wireless transmission (e.g., an infrared transmission, ZigBee transmission, ultrawideband (UWB) transmission, WiFi transmission, radio frequency (RF) transmission, DLP light signal transmission or Bluetooth transmission), and the control circuit 106 generates the control signals S1 and S2 according to the reference information SC. For example, as shown in FIG. 1, a signal emitter 120 is externally connected to the video output apparatus 110, and is controlled by the video output apparatus 110 for transmitting the reference information SC generated by the video output apparatus 110 to pair of shutter glasses 100. However, in another exemplary embodiment, the signal emitter 120 may also be integrated within the video output apparatus 110. Thus, the control circuit 106 may generate needed control signals S1 and S2 according to the reference information SC.

In other words, the video output apparatus 110 only provides synchronization signal rather than the control information of the timing when the first shutter lens 102/the second shutter lens 104 should be opened or closed; instead, the control circuit 106 controls the timing when the first shutter lens 102/the second shutter lens 104 should be opened or closed according to the synchronization signal provided by the video output apparatus 110. In an alternative design, the reference information SC may be directly be the control information of the first shutter lens 102 and the second shutter lens 104 (i.e., the video output apparatus 110 dominates the timing when the first shutter lens 102 and the second shutter lens 104 should be opened or closed). In this way, the control circuit 106 generates corresponding control signals S1 and S2 simply according to the received reference information SC. Please note that what described above is for illustrative purpose only, and is not meant to be a limitation to the present invention.

In the present exemplary embodiment, there are two control mechanisms employed for controlling the first shutter lens 102 and the second shutter lens 104: one is a shutter lens control mechanism for the video output apparatus 110 operating under a lower refresh rate (e.g., 60 Hz or 120 Hz), and the other one is a shutter lens control mechanism for the video output apparatus 110 operating under a higher refresh rate (e.g., 240 Hz or 480 Hz). In the following, a plurality of exemplary embodiments are given to provide further illustration for these two shutter lens control mechanisms.

Figure 2:
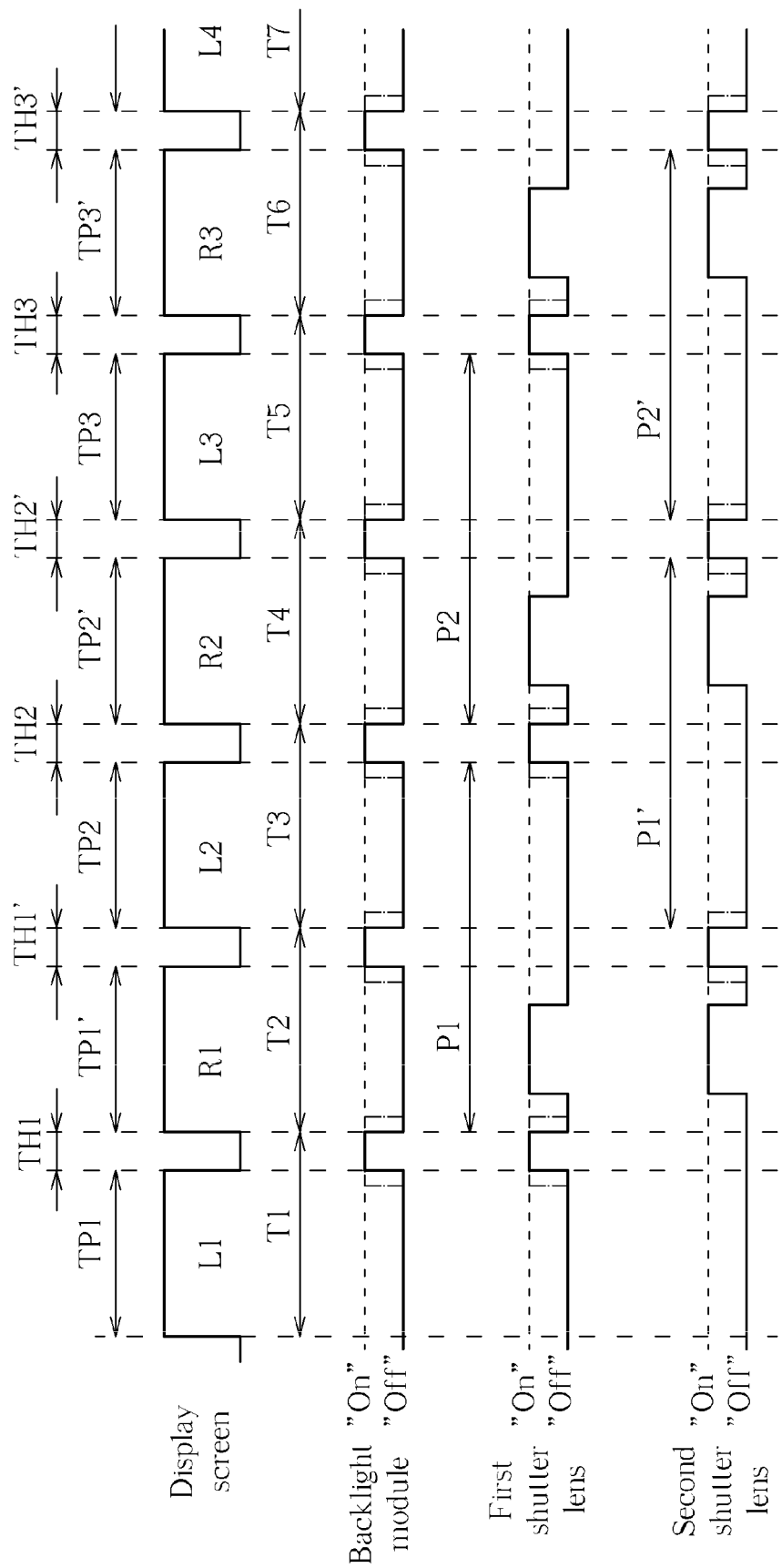
FIG. 2 is a sequence diagram of the first control method employed for controlling the pair of shutter glasses shown in FIG. 1.

Please refer to FIG. 2, which is a sequence diagram of the first control method employed for controlling the pair of shutter glasses 100 shown in FIG. 1. In this exemplary embodiment, the video output apparatus 110 operates under a lower refresh rate, such as 60 Hz, 96 Hz, 100 Hz, 110 Hz or 120 Hz. As shown in FIG. 2, the video output apparatus 110 respectively outputs a first image (e.g., L1, L2, L3 or L4) and a second image (e.g., R1, R2 or R3) during a plurality of image output periods (e.g., T1-T7), alternately, wherein one of the first image and the second image is a left-eye image, and the other one of the first image and the second image is a right-eye image. In other words, in one exemplary embodiment, the first images L1, L2, L3 and L4 stand for left-eye images and the second images R1, R2 and R3 stand for right-eye images; however, in another exemplary embodiment, the first images L1, L2, L3 and L4 stand for eight-eye images and the second image R1, R2 and R3 stand for left-eye images. Besides, as shown in FIG. 2, each image output period comprises an image driving period and an image stabilization period. For example, the image output period T1 comprises an image driving period TP1 and an image stabilization period TH1, and the image output period T2 comprises an image driving period TP1' and an image stabilization period TH1', and so on. Please note that, according to the display technique used, each image stabilization period may comprise a non-image driving period or an image maintaining period. For example, finishing transmitting an image driving signal within an image driving period or not transmitting any image driving signal within an image stabilization period would make the image now regarded as being in a stabilizing state. For example, as to pixels (e.g., liquid crystal cells or OLED units), a pixel may be regarded as operating in an image stabilization period starting from the time point when the pixel becomes stable due to being driven by the image driving signal transmitted within the image driving period. On the other hand, a pixel may also be regarded as operating in an image stabilization period starting from the time point when there is no image driving signal transmitted to the pixel.

In each image driving period, the display screen 112 (e.g., an LCD panel) successively sets pixels according to the display data, wherein the pixels are driven line by line from the top to the bottom in an image and pixel by pixel from the left to the right in each line of the image to thereby output the image to be displayed now. Alternatively, according to a different placement setting or hardware design of the LCD panel, the display screen 112 may output the image to be displayed by successively setting pixels according to the display data, wherein the pixels are driven line by line from the bottom to the top in an image and pixel by pixel from the right to the left in each line of the image, or may be driven according to other pixel updating sequence (e.g., the LCD panel is divided into several display areas, and each display area has its own pixel updating order). In short, the display screen 112 will replace the displayed previous image with a current image to be displayed. Therefore, before the current image to be displayed has totally replaced the previous image displayed on the display screen 112, the display screen 112 will output an image that comprises part of the current image and part of the previous image within the image driving period. On the other hand, within the following image stabilization period, the display screen 112 will wait for the image stabilization of the current image to be displayed. For example, the display screen 112 will not drive pixels according to any display data. That is, each image stabilization period may be a vertical blanking interval (VBI).

As described above, the control circuit 106 controls the first shutter lens 102 to be switched between an on-state ("ON") and an off-state ("OFF"), and controls the second shutter lens 104 to be switched between an on-state ("ON") and an off-state ("OFF"). In this exemplary embodiment, the control circuit 106 controls the first shutter lens 102 to stay in the on-state within two image stabilization periods (e.g., TH1 and TH2 or TH2 and TH3) respectively corresponding to two successive specific first images (e.g., L1 and L2 or L2 and L3). For example, the first shutter lens 102 is switched from the off-state to the on-state at the start point of the image stabilization period, and is switched from the on-state to the off-state at the end point of the stabilizing period. However, it is only used as an example rather than a limitation to the present invention. In another exemplary embodiment, the first shutter lens 102 may switch from the off-state to the on-state before the start point of the image stabilization period and/or switch from the on-state to the back state after the end point of the image stabilization period. That is, the shutter-on period in which the first shutter lens 102 stays in the on-state may cover and extend beyond the image stabilization period, as illustrated by the expanded parts marked by dotted lines in the figure). In addition, within a first time interval (e.g., P1 or P2) between the two image stabilization periods (e.g., TH1 and TH2 or TH2 and TH3) respectively corresponding to the two specific first images (e.g., L1 and L2 or L2 and L3), the control circuit 106 controls the first shutter lens 102 to open once more (i.e., switch from the on-state to the off-state and then switch from the off-state back to the on-state). Similarly, the control circuit 106 controls the second shutter lens 104 to stay in the on-state within two image stabilization periods (e.g., TH1' and TH2' or TH2' and TH3') respectively corresponding to two successive specific second images (e.g., R1 and R2 or R2 and R3). For example, the second shutter lens 104 is switched from the off-state to the on-state at the start point of image stabilization period, and is switched from the on-state to the off-state at the end point of stabilizing period. Alternatively, the second shutter lens 104 may switch from the off-state to the on-state before the start point of the image stabilization period and/or switch from the on-state to the back state after the end point of the image stabilization period. That is, the shutter-on period in which the second shutter lens 104 stays in the on-state may cover and extend beyond the image stabilization period, as illustrated by the expanded parts marked by dotted lines in the figure. In addition, within a second time interval (e.g., P1' or P2') between the two image stabilization periods (e.g., TH1' and TH2' or TH2' and TH3') respectively corresponding to the two specific second images (e.g., R1 and R2 or R2 and R3), the control circuit 106 controls the second shutter lens 104 to open once more (i.e., switch from the on-state to the off-state and then switch from the off-state back to the on-state).

In other words, according to the operating sequence shown in FIG. 2, the control circuit 106 controls the first shutter lens 102 to stay in an on-state within two image stabilization periods (e.g., TH1 and TH2 or TH2 and TH3) respectively corresponding to two successive specific first images (e.g., L1 and L2 or L2 and L3), and controls the second shutter lens 104 to stay in the on-state within an image stabilization period (e.g., TH1' or TH2') corresponding to a specific second image (e.g., R1 or R2) between the two specific first images (e.g., L1 and L2 or L2 and L3). Besides, as readily understood from FIG. 2, the control circuit 106 further controls the first shutter lens 102 and the second shutter lens 104 to simultaneously stay in the off-state only within several discontinuous time periods of a time interval (e.g., a time interval between TH1 and TH1') between the image stabilization period corresponding to the specific second image and an image stabilization period corresponding to one of the two specific first images.

Please note that FIG. 2 only shows that the control circuit 106 controls the first shutter lens 102 and the second shutter lens 104 during an operating time period including, for example, image output periods T1-T6. In fact, the control circuit 106 will repeat the same control mechanism mentioned above for controlling the first shutter lens 102 and the second shutter lens 104 to be switched between the on-state and the off-state by referring to the same glasses cycle (i.e., the cycle that left eye and right eye respectively view the image once) or different glasses cycles within the previous operating time period(s) (e.g., the image output period before the image output period T1) and the following operating time period(s) (e.g., the image output period following the image output period T6).

Figure 3:
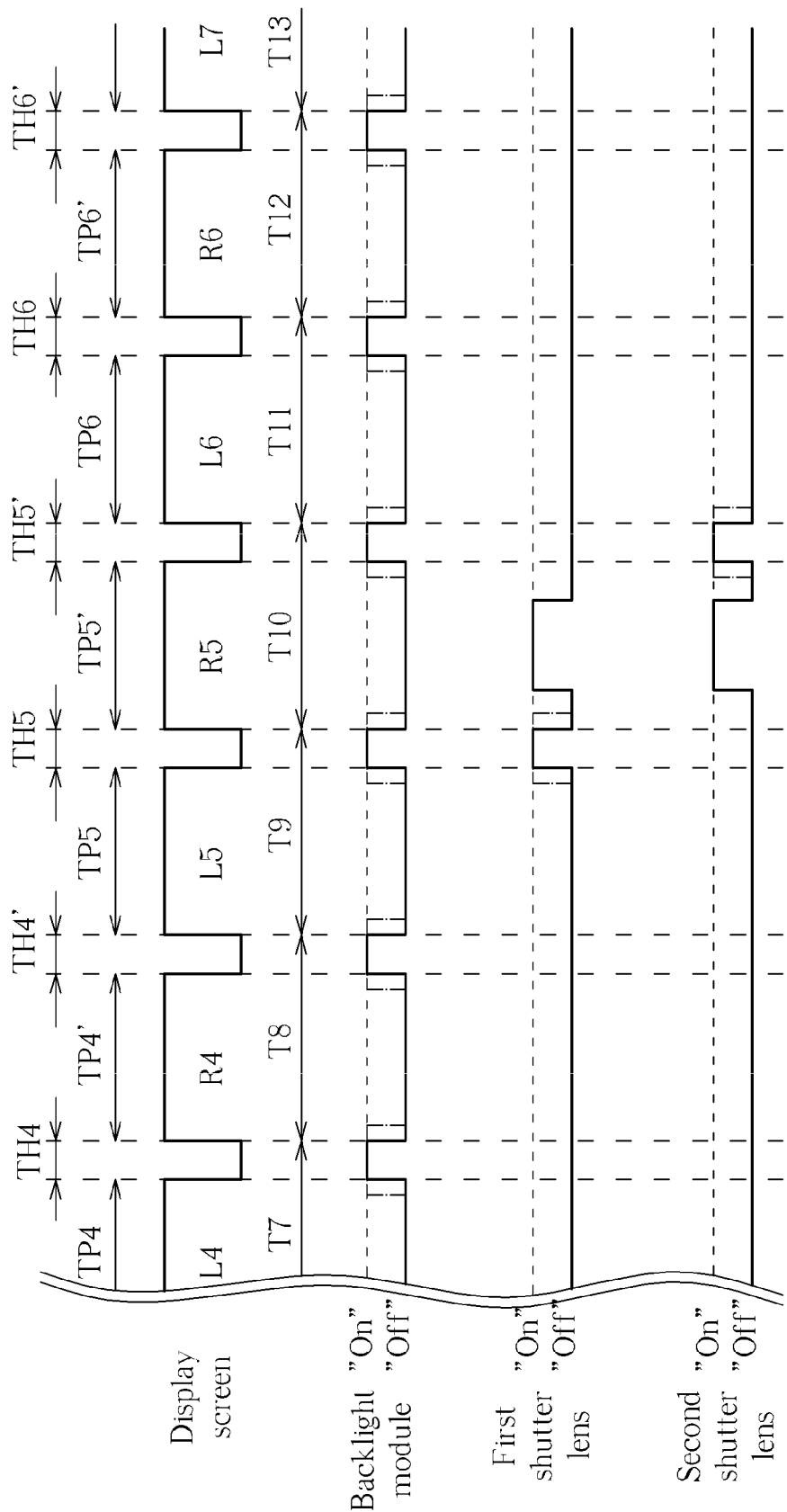
FIG. 3 is a continued sequence diagram of the operation shown in FIG. 2 based on a concept of using mixed different glasses cycles.

As to the operation with mixed glasses cycles, please refer to FIG. 2 in conjunction with FIG. 3. FIG. 3 is a continued sequence diagram for the operation in FIG. 2 which operates under the concept of mixed glasses cycles. As shown in FIG. 2, the original glasses cycle is equal to a sum of image output periods of two images (e.g., T1+T2 or T3+T4). However, after the image stabilization period TH2' ends, the glasses cycle is expanded to a sum of image output periods of four images (e.g., T5+T6+T7+T8 or T9+T10+T11+T12). In the present exemplary embodiment, the first shutter lens 102 is switched from the off-state to the on-state at the start point of the image stabilization period TH5 corresponding to the first image L5, and the second shutter lens 104 is switched from the off-state to the on-state within the image driving period TP5' corresponding to the second image R5. Please note that, using a sum of image output periods of four images as another glasses cycle is for illustrative purposes only, and is not meant to be a limitation of the present invention. In fact, the number of image output periods covered in one glasses cycle may be adjusted according to the actual application requirement/consideration. Besides, in the exemplary embodiment of mixed different glasses cycles as described above, the same control mechanism is repeated in another longer glasses cycle. However, in this longer glasses cycle, other control mechanism(s), such as other control mechanism(s) disclosed below, may be employed. Thus, within the time period (e.g., T7-T8) that the original control mechanism has no control over the on/off-state of the shutter lens, other control mechanism(s) may be active to control the on/off-state of the shutter lens. This alternative design also obeys the spirit of the present invention.

As described above, the output result of the display screen 112 within the image driving period comprises part of the current image and part of the previous image. Therefore, in order to avoid trash images coming into user's eyes, in the present exemplary embodiment, the backlight module 114 is enabled to stay in the on-state ("ON") only within the image stabilization periods TH1, TH1', TH2, TH2', TH3, and TH3'. In other words, the backlight module 114 is disabled to stay in the off-state ("OFF") within the image driving periods TP1, TP1', TP2, TP2', TP3, and TP3'. Due to lack of backlight source needed, the display output of the display screen 112 within the image driving periods TP1, TP1', TP2, TP2', TP3, and TP3' will not be seen by user's eyes. Thus, though the first shutter lens 102 and the second shutter lens 104 are open (i.e., stay in the on-state) within image driving periods TP1', TP2', and TP3', they will not affect user's viewing of stereo images. However, the shutter-on period of the first shutter lens 102/the second shutter lens 104 is increased, resulting in increased ambient brightness the user feels. Besides, since the shutter-on period of the first shutter lens 102/the second shutter lens 104 is increased, the shutter-off period of the first shutter lens 102/the second shutter lens 104 is decreased accordingly, thereby reducing the power consumption of the pair of shutter glasses 100.

Please note that, in another exemplary embodiment, the backlight module 114 is enabled to stay in the on-state within the image stabilization periods TH1, TH1', TH2, TH2', TH3, and TH3'; additionally, the backlight-on periods of the backlight module 114 may also slightly expand forward/backward from the start points of the image stabilization periods TH1, TH1', TH2, TH2', Th3, and TH3', and/or slightly expand forward/backward from the end point of the image stabilization periods TH1, TH1', TH2, TH2', TH3, and TH3'. In other words, the backlight module 114 is allowed to be switched from the off-state to the on-state before the start point of the image stabilization period, and/or switch from the on-state back to the off-state after the end point of the image stabilization period. That is, the backlight-on period of the backlight module 114 staying in the on-state may cover and extend beyond the image stabilization period. In brief, the backlight module 114 stays in the on-state within the image stabilization period, and stays in the off-state within the following image driving period; in addition, a length of a period during which the backlight module 114 stays in the off-state within the image driving period is shorter than or equal to a length of the image driving period.

Figure 4:
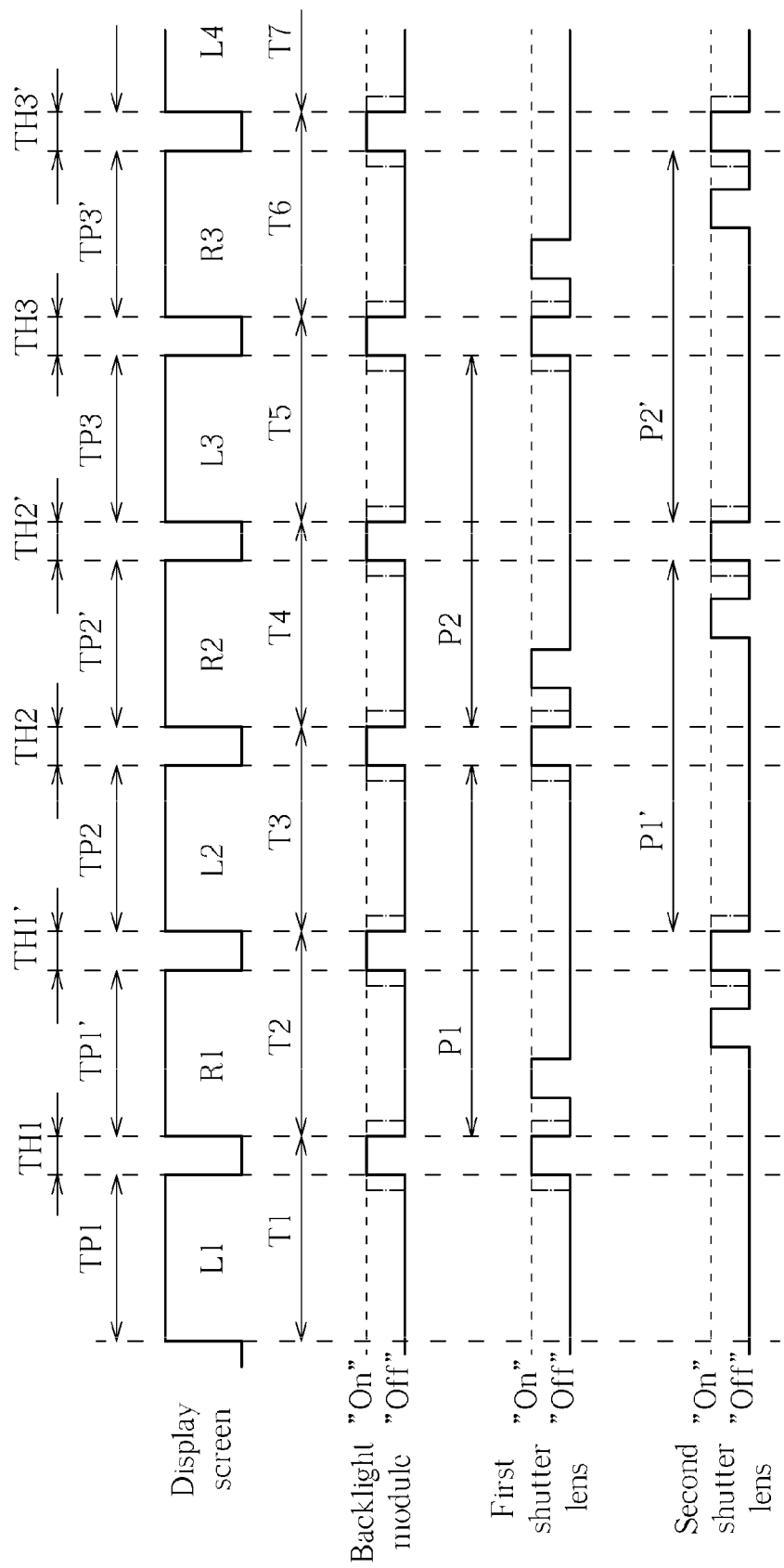
FIG. 4 is a sequence diagram of the second control method employed for controlling the pair of shutter glasses shown in FIG. 1.

As shown in FIG. 2, the shutter-on period in which the first shutter lens 102 stays in the on-state during the first time interval (e.g., P2) is at least partly overlapped with the shutter-on period in which the second shutter lens 104 stays in the on-state during the second time interval (e.g., P1'). However, this is not meant to be a limitation of the present invention. Please refer to FIG. 4. FIG. 4 is a sequence diagram of the second control method employed for controlling the pair of shutter glasses shown in FIG. 1. In the present exemplary embodiment, the shutter-on period in which the first shutter lens 102 stays in the on-state during the first time interval (e.g., P2) is not overlapped with the shutter-on period in which the second shutter lens 104 stays in the on-state during the second time interval (e.g., P1').

Figure 5:
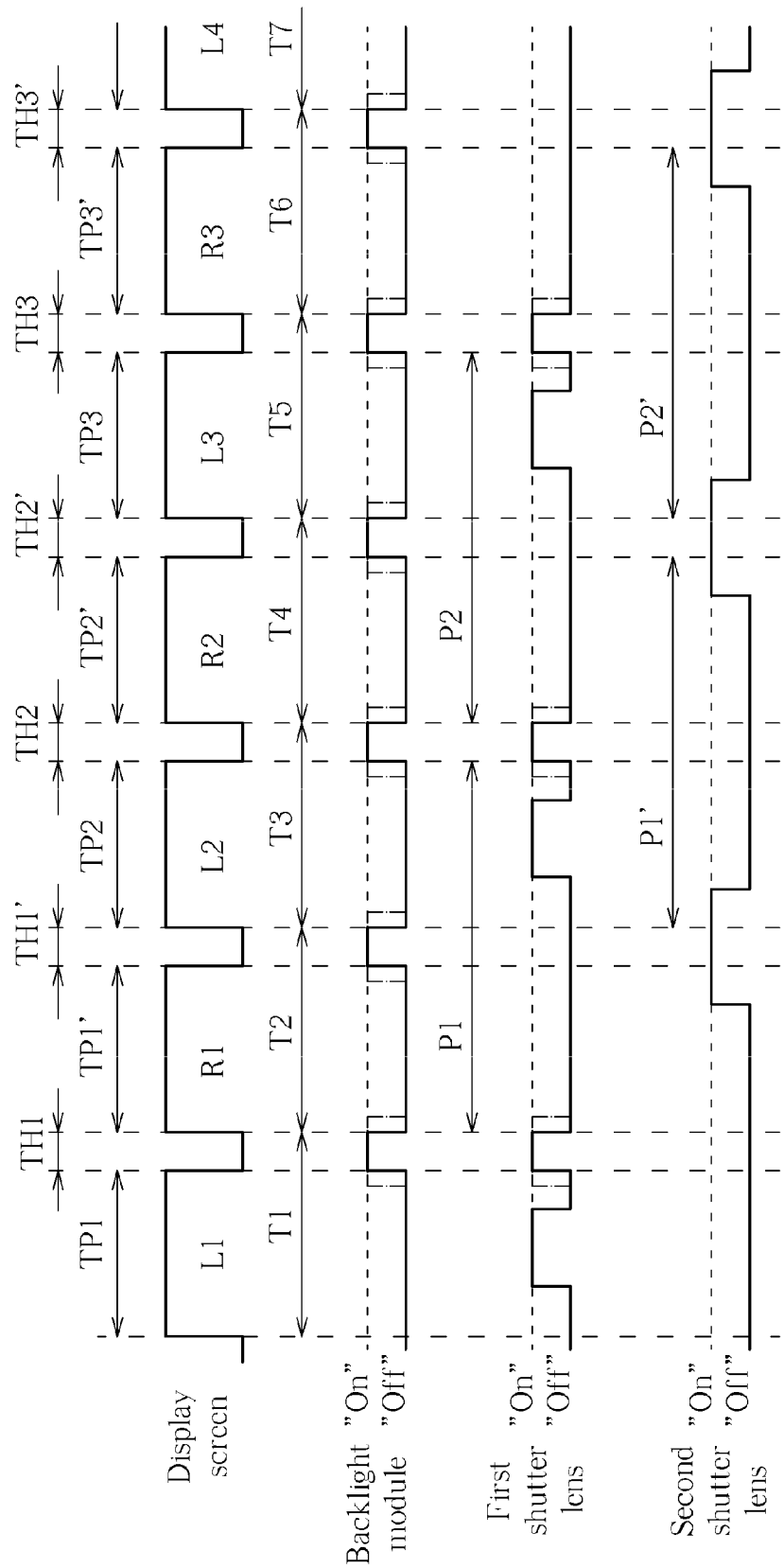
FIG. 5 is a sequence diagram of the third control method employed for controlling the pair of shutter glasses shown in FIG. 1.

In the exemplary embodiment described above, the control circuit 106 controls both the first shutter lens 102 and the second shutter lens 104 respectively to open once more (i.e., switch from the off-state to the on-state and then switch from the on-state to the off-state) during the time interval (e.g., P1 and P1'). However, this is not meant to be a limitation of the present invention. Please refer to FIG. 5, which is a sequence diagram of the third control method employed for controlling the pair of shutter glasses shown in FIG. 1. In the present exemplary embodiment, the control circuit 106 only controls the first shutter lens 102 to open once more (i.e., switch from the off-state to the on-state and then switch from the on-state back to the off-state) within a first time interval (e.g., P1 or P2) between two image stabilization periods (e.g., TH1 and Th2 or TH2 and TH3) respectively corresponding to two successive first images. In the present exemplary embodiment, in an interval between two image stabilization periods respectively corresponding to two specific first images, the control circuit 106 controls the first shutter lens 102 to open once within an image driving period (e.g., TP1, TP2 or TP3). However, this is for illustrative purposes only. That is, as long as the control circuit 106 controls the first shutter lens 102 to open once more within a first time interval between two image stabilization periods respectively corresponding to two specific first images (e.g., the first shutter lens 102 enters an on-state within the image stabilization period TP1', TP2', or TP3'), the spirit of the present invention is obeyed. Please note that the first shutter lens 102 in the present exemplary embodiment may be a shutter lens of pair of shutter glasses 100 that is utilized for viewing left-eye images, or a shutter lens of pair of shutter glasses 100 that is utilized for viewing right-eye images. It should be noted that, in the present exemplary embodiment, the number of shutter-on times of the first shutter lens 102 is twice as large as the number of shutter-on times of the second shutter lens 104 during a certain period of time; however, this is not meant to be a limitation of the present invention. Those skilled in the art will readily observe that, under the premise of not departing from the spirit of the present invention, a variety of changes made to the number of shutter-on times of the first shutter lens 102 and the number of shutter-on times of the second shutter lens 104 during a certain period of time is feasible.

Figure 6:
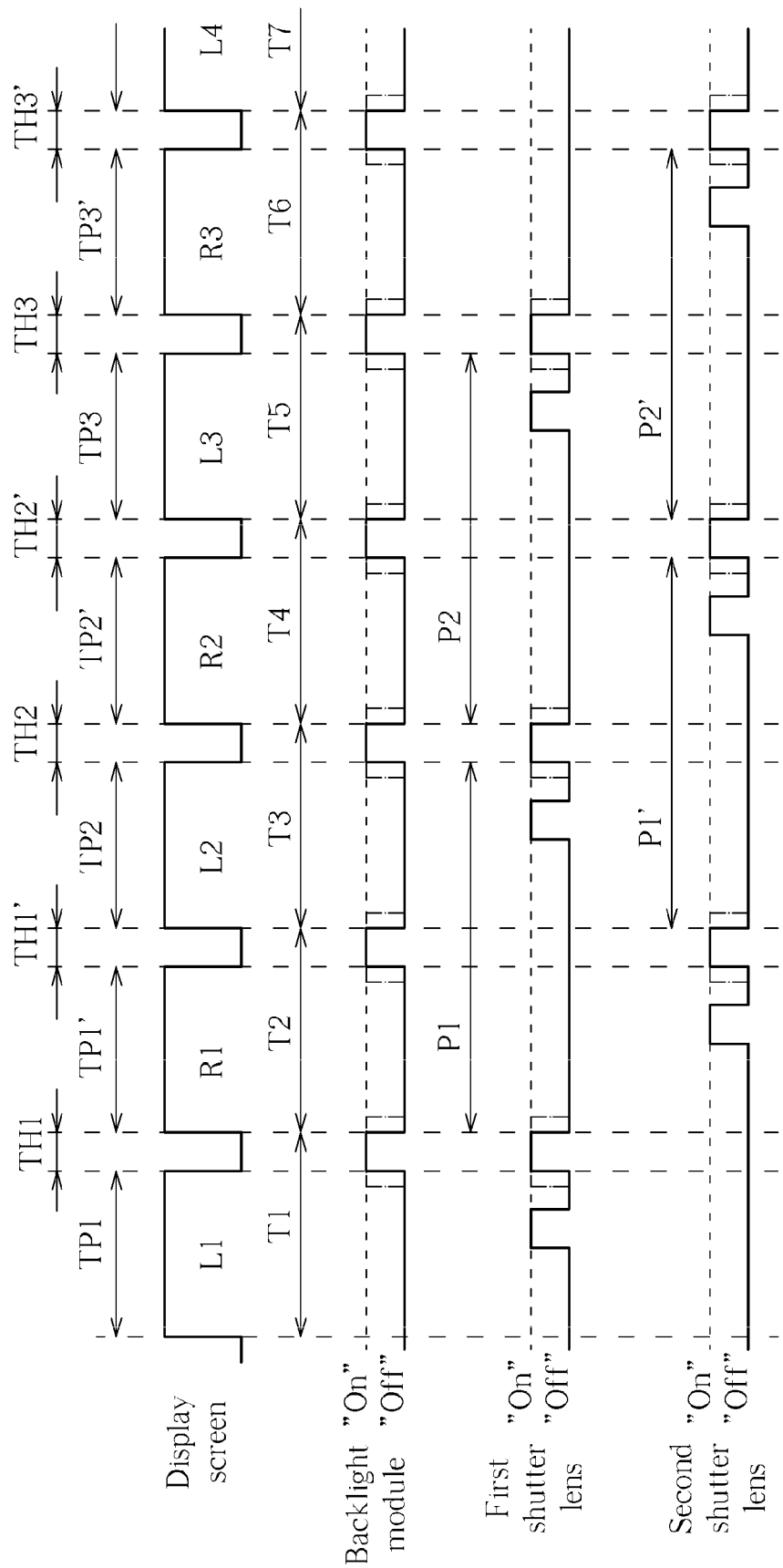
FIG. 6 is a sequence diagram of the fourth control method employed for controlling the pair of shutter glasses shown in FIG. 1.
Figure 7:
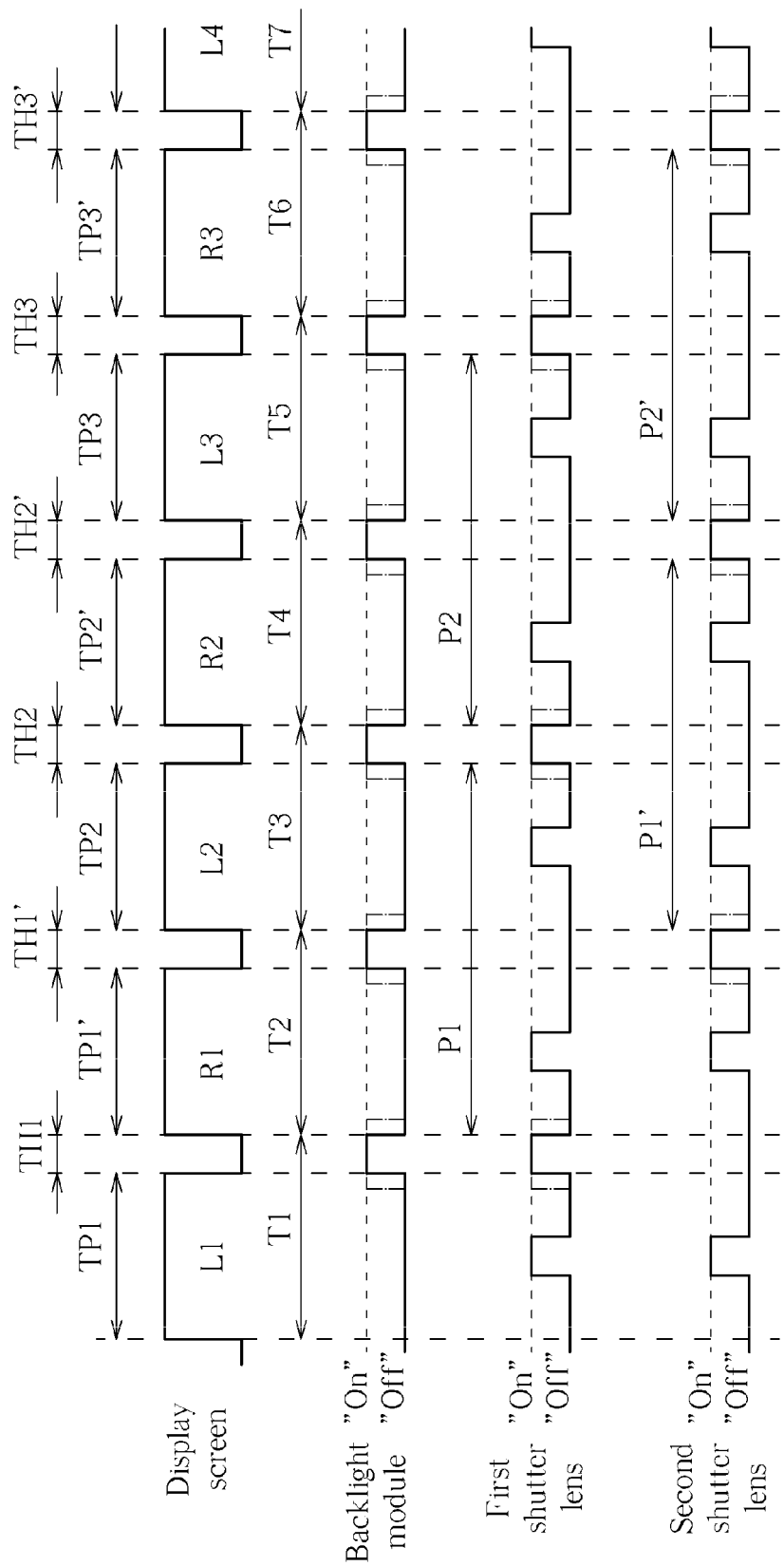
FIG. 7 is a sequence diagram of the fifth control method employed for controlling the pair of shutter glasses shown in FIG. 1.
Figure 8:
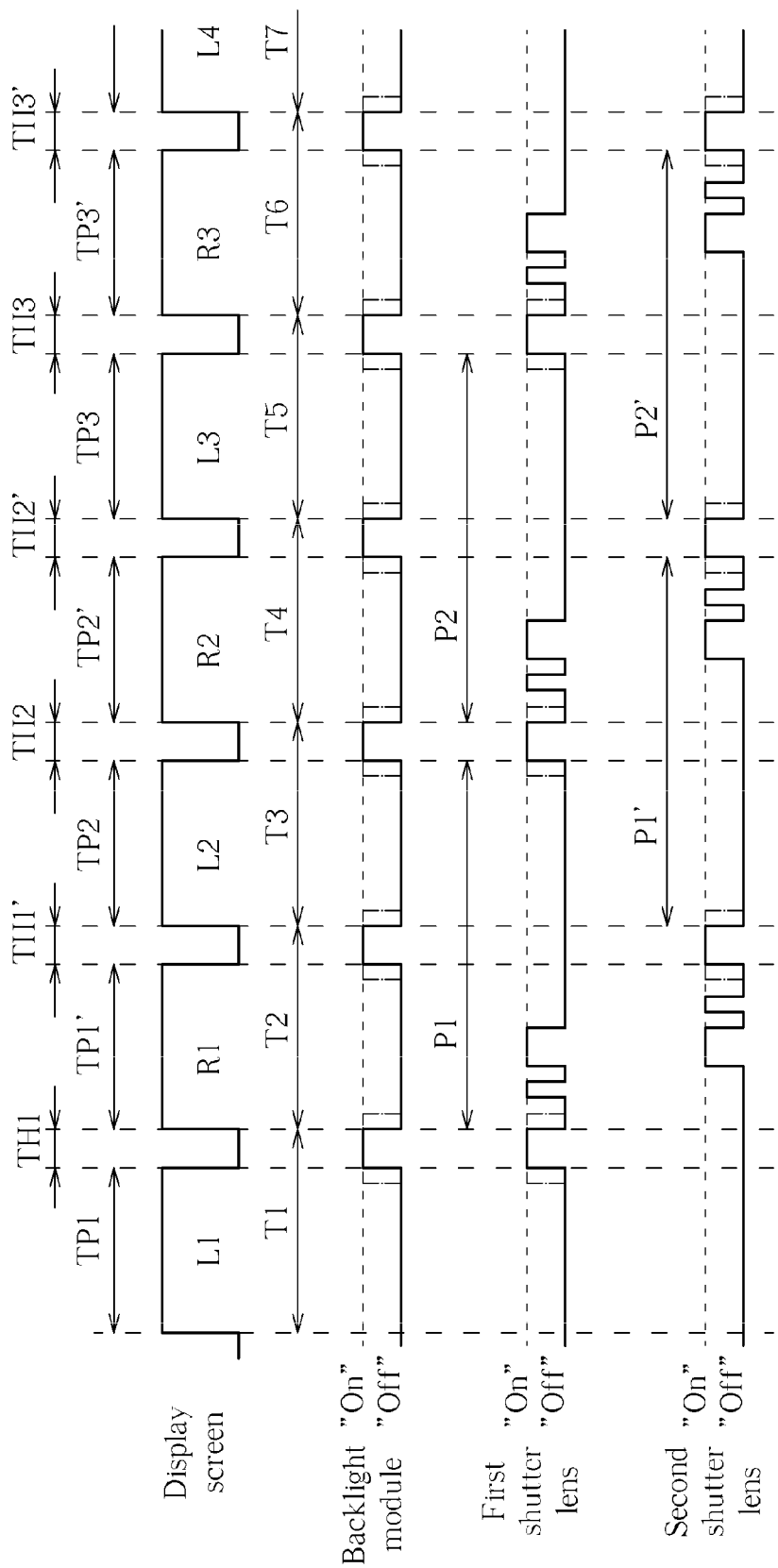
FIG. 8 is a sequence diagram of the sixth control method employed for controlling the pair of shutter glasses shown in FIG. 1.
Figure 9:
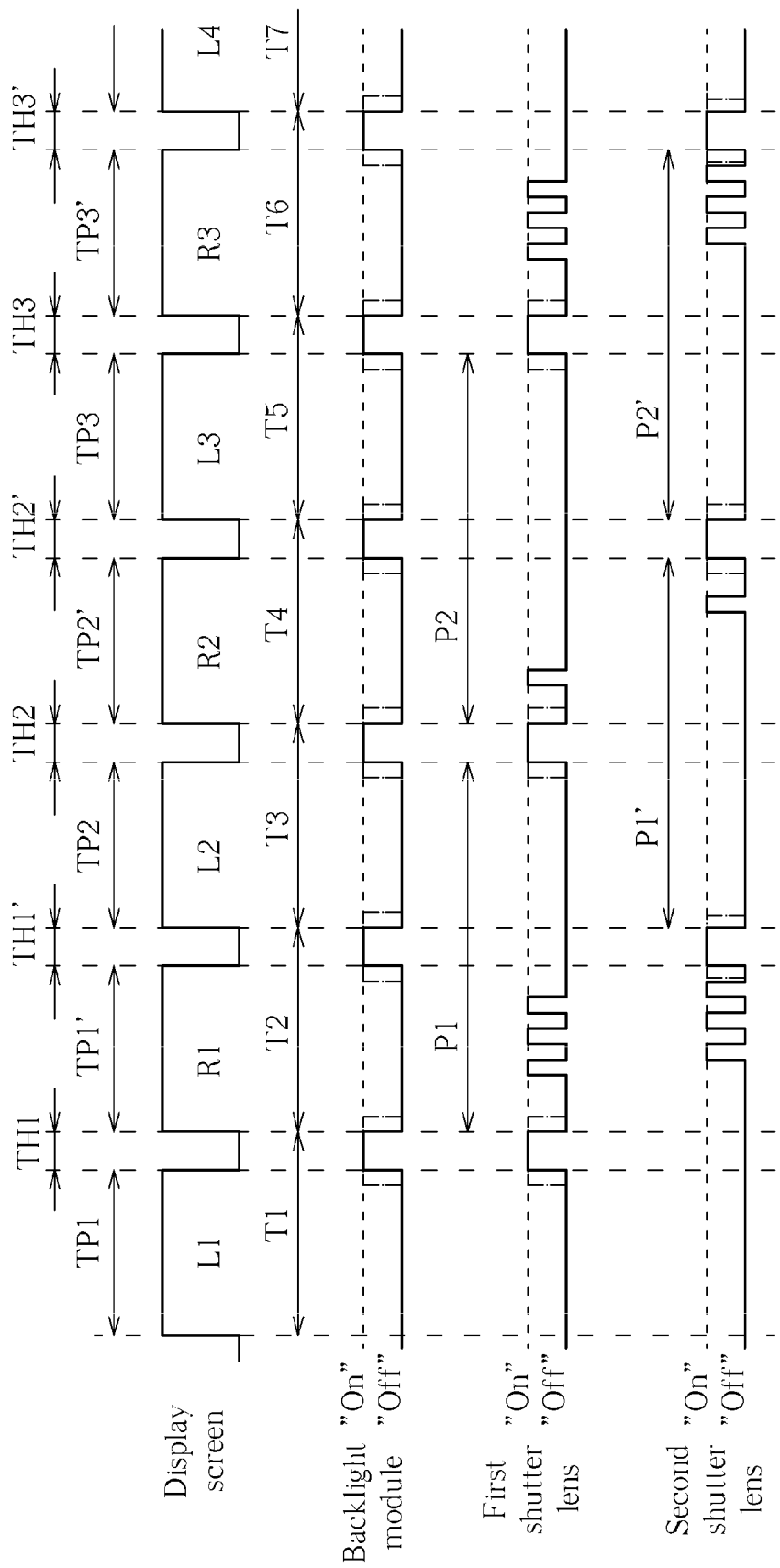
FIG. 9 is a sequence diagram of the seventh control method employed for controlling the pair of shutter glasses shown in FIG. 1.
Figure 10:
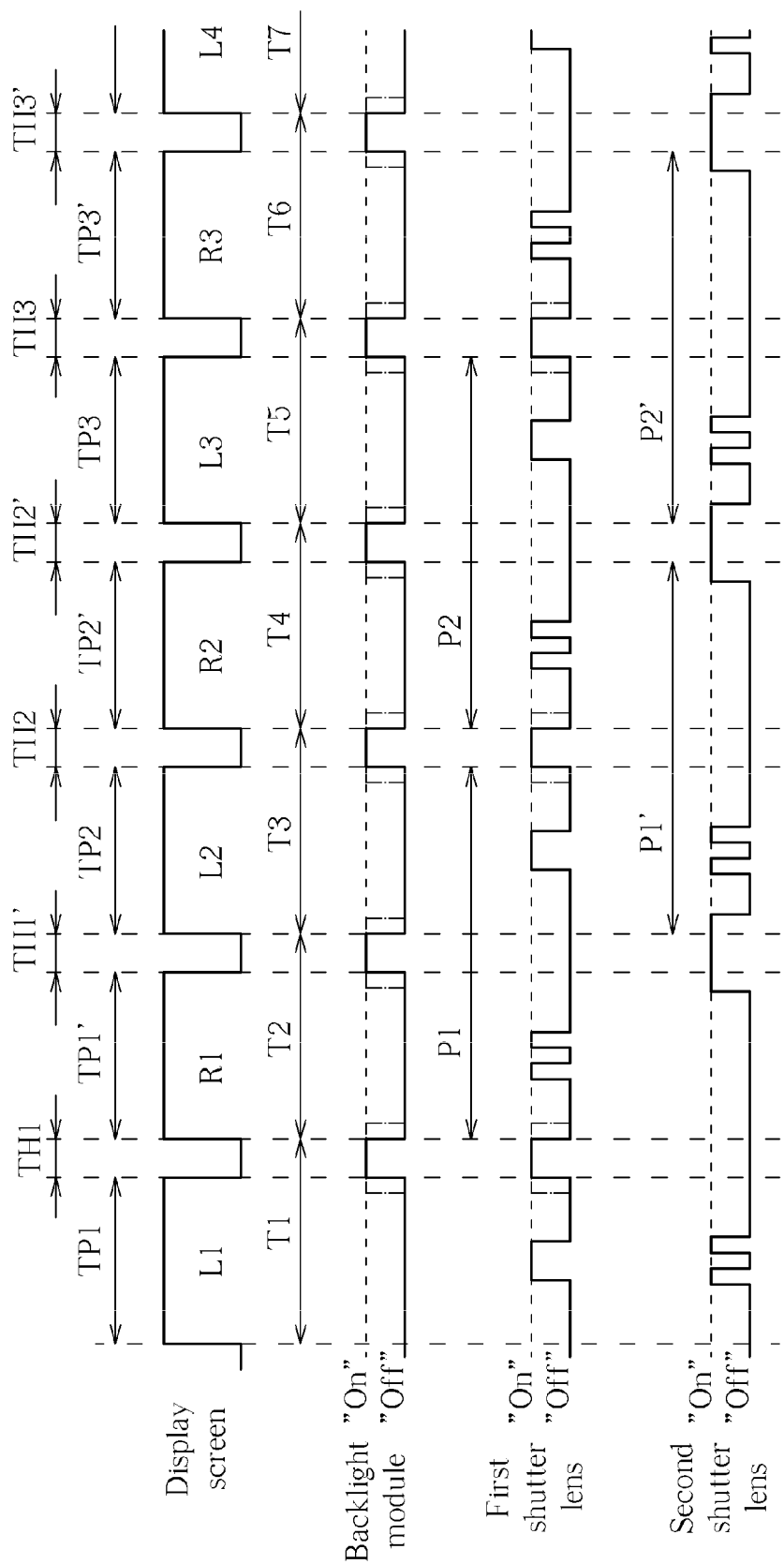
FIG. 10 is a sequence diagram of the eighth control method employed for controlling the pair of shutter glasses shown in FIG. 1.

In the exemplary embodiment shown in FIG. 4, during a first time interval (e.g., P1 or P2) between two image stabilization periods (e.g., TH1 and TH2 or TH2 and TH3) respectively corresponding to two specific first images (e.g., L1 and L2 or L2 and L3), the first shutter lens is open once more (i.e., switch from the off-state to the on-state and then switch from the on-state back to the off-state) within the image driving period (e.g., TP1' or TP2') following the first image stabilization period of the two image stabilization periods. However, this is not meant to be a limitation of the present invention. Please refer to FIG. 6, which is a sequence diagram of the fourth control method employed for controlling the pair of shutter glasses shown in FIG. 1. Regarding the first shutter lens 102 in the present exemplary embodiment, during the first time interval (e.g., P1 or P2) between two image stabilization periods (e.g., TH1 and TH2 or TH2 and TH3) respectively corresponding to two specific first images (e.g., L1 and L2 or L2 and L3), the first shutter lens 102 is open once more (i.e., switch from the off-state to the on-state and then switch from the on-state back to the off-state) within the image driving period (e.g., TP2 or TP3) before the second image stabilization period of the following two image stabilization periods. This alternative design also obeys the spirit of the present invention and therefore falls within the scope of the present invention.

In the exemplary embodiment described above, the control circuit 106 controls the first shutter lens 102/the second shutter lens 104 to open once more within the first time interval (e.g., P1 or P2)/the second time interval (e.g., P1' or P2'). However, this is not meant to be a limitation of the present invention. The control circuit 106 may control the first shutter lens 102/the second shutter lens 104 to open several times (i.e., switch from the off-state to the on-state and switch from the on-state back to the off-state more than once) during the first time interval (e.g., P1 or P2)/the second time interval (e.g., P1' or P2'), as shown in FIG. 7-FIG. 10. FIG. 7-FIG. 10 are sequence diagrams of other control methods employed for controlling the pair of shutter glasses shown in FIG. 1. Since those skilled in the art will readily understand operations of the display screen 112, the backlight module 114, the first shutter lens 102 and the second shutter lens 104 in FIG. 7-FIG. 10 after reading above paragraphs, further description is omitted here for brevity.

In the exemplary embodiments described above, within the image stabilization periods such as TH1, TH1', TH2, TH2', TH3, and TH3', the user is allowed to view images mainly by enabling the backlight module 114, while in the shutter-on period, the liquid crystal cells in the liquid crystal layer of the first shutter lens 102/the second shutter lens 104 rotate before the image stabilization period in order to make the first shutter lens 102/the second shutter lens 104 switch from the off-state to the on-state, and rotate after the image stabilization period in order to make the first shutter lens 102/the second shutter lens 104 switch from the on-state to the off-state. Therefore, when the user is viewing images within the image stabilization period, the present invention may further decrease the brightness attenuation resulted from the response time (i.e., the process of rotating) of the liquid crystal cells.

Figure 11:
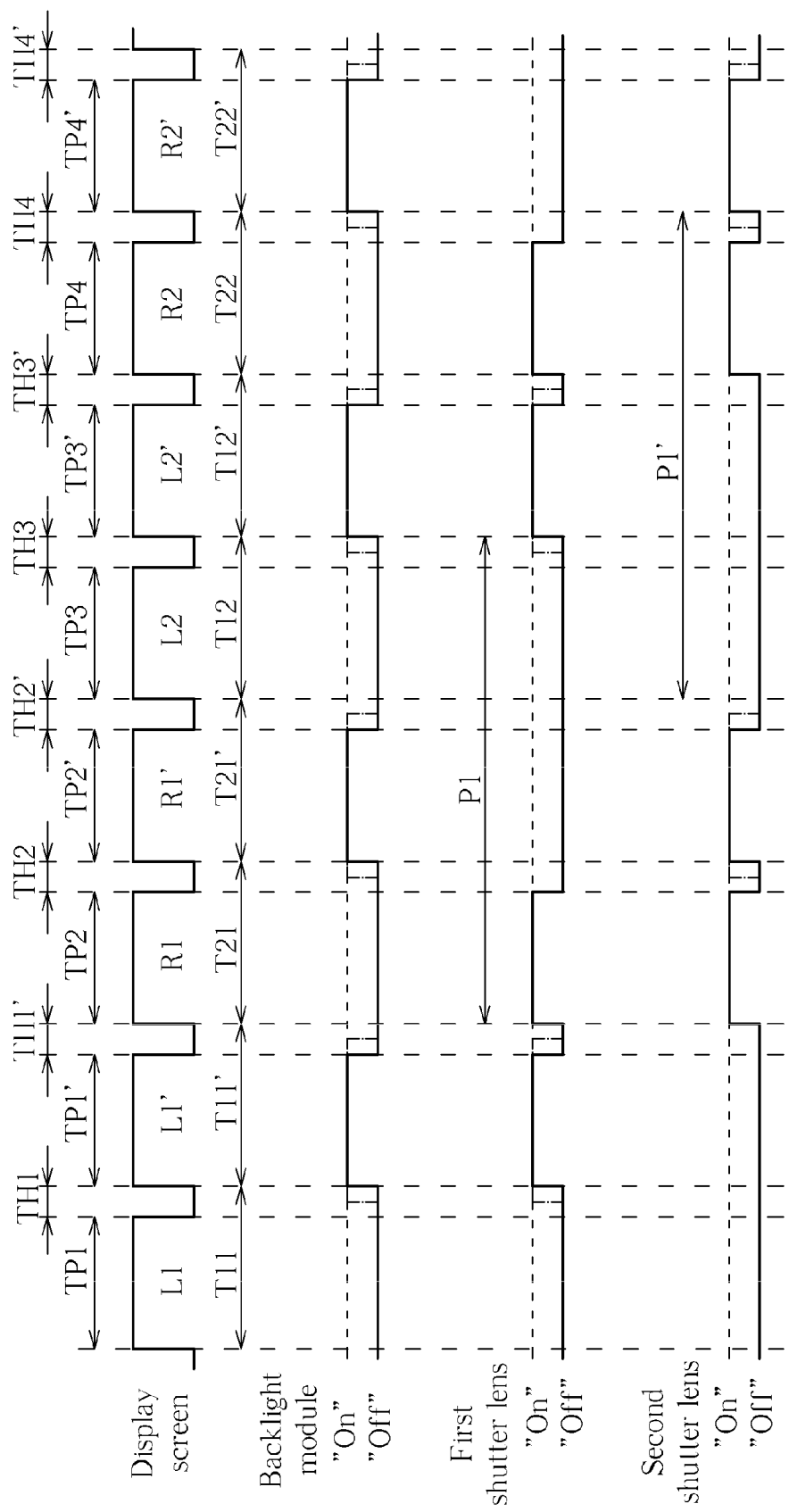
FIG. 11 is a sequence diagram of the ninth control method employed for controlling the pair of shutter glasses shown in FIG. 1.

Please refer to FIG. 11, which is a sequence diagram of the ninth control method of the pair of shutter glasses shown in FIG. 1. In the present exemplary embodiment, the video output apparatus 110 is operated under a higher refresh rate such as 200 Hz or 240 Hz. However, the video output apparatus 110 may be operated under an even higher refresh rate such as 400 Hz or 480 Hz. As to the same primary image, there are more secondary images included in the display output when the video output apparatus 110 is operating under a higher refresh rate such as 480 Hz. However, no matter whether the video output apparatus 110 is operated under a refresh rate of 240 Hz or a higher refresh rate (e.g., 480 Hz), the control method of the pair of shutter glasses is basically the same. For clarity and brevity, the following paragraphs only provide a control method of pair of shutter glasses 100 applied to the video output apparatus operated under a refresh rate of 240 Hz as an example. As shown in FIG. 11, the video output apparatus 110 displays a group of first images (e.g., (L1, L1') or (L2, L2')) and a group of second images (e.g., (R1, R1') or (R2, R2')), alternately. Besides, the video output apparatus 110 successively displays a primary first image (e.g., L1 or L2) and a secondary first image (e.g., L1' or L2') included in the group of first images in order during a plurality of first image output periods (e.g., (T11, T11') or (T12, T12')), respectively, and successively displays a primary second image (e.g., R1 or R2) and a secondary second image (e.g., R1' or R2') both included in the group of second images in order during a plurality of second image output periods (e.g., (T21, T21') or (T22, T22')), respectively. Please note that one of the groups of first images and the group of second images is a group of left-eye images, and the other of the groups of first images and the group of second images is a group of right-eye images. In other words, in one exemplary embodiment, the first images L1, L1', L2, and L2' stand for left-eye images, and the second images R1, R1', R2, and R2' stand for right-eye images; however, in another exemplary embodiment, the first images L1, L1', L2, and L2' may stand for right-eye images, and the second images R1, R1', R2, and R2' may stand for left-eye images.

Analogously, when the video output apparatus 110 is operated under a higher refresh rate (e.g., 480 Hz), the video output apparatus 110 will also display a group of first images and a group of second images, alternately. For example, in one exemplary embodiment, the display order of the images is: L1, L1', R1, R1', L2, L2', R2, R2', wherein L1 and L2 are primary first images, L1' and L2' are secondary first images, R1 and R2 are primary second images, and R1' and R2' are secondary second images. Therefore, groups of first images are composed of (L1, L1') and (L2, L2'), respectively, and groups of second images are composed of (R1, R1') and (R2, R2'), respectively. Please note that in present exemplary, the numbers of the secondary first mages and the secondary second images are for illustrative purposes only. In another exemplary embodiment, the display order of the images is: L1, L1', L1'', L1''', R1, R1', R1'', R1''', wherein L1 is a primary first image, L1', L1'' and L1''' are secondary first images, R1 is a primary second image, and R1', R1'' and R1''' are secondary second images. Therefore, a group of first images is composed of (L1, L1', L1'', L1'''), and a group of second images is composed of (R1, R1', R1'', R1'''). Please note that, in the present exemplary embodiment, the numbers of the secondary first images and the secondary second images are for illustrative purposes only. It should be noted that, in the exemplary embodiment, the backlight module 114 provides a brighter backlight to secondary first images L1, L1', L1'', L1''' and secondary second images R1, R1', R1'', R1'''; however, this is for illustrative purposes only, and is not meant to be a limitation of the present invention. Besides, in a case where the video output apparatus 110 (e.g., a liquid crystal display, OLED display, plasma display or display/projector of other display techniques) is operated under a higher refresh rate such as 240 Hz or above, as to the same group of first/second images, the length of all secondary first/second images is longer than or equal to the length of the primary first/second images.

In one exemplary embodiment, the secondary first image is a primary first image in the same group of the first images that is displayed again, and the secondary second image is a primary second image in the same group of the second images that is displayed again. Each of the first image output periods and second image output periods comprises an image driving period and an image stabilization period (e.g., the first image output period T11 comprises an image driving period TP1 and an image stabilization period TH1, the image output period T11' comprises an image driving period TP1' and an image stabilization period TH1', and so on). As described above, as to the liquid crystal display, controlling the rotation of the liquid crystal cell is needed in order to achieve the objective of controlling light transmission rate. Regarding the liquid crystal display operated under a lower refresh rate (e.g., 60 Hz or 120 Hz), the required rotation time of liquid crystal cell is taken into consideration, and thus the image stabilization period immediately following the image driving period is mainly utilized for displaying stereo images. Regarding the liquid crystal display operated under a higher refresh rate (e.g., 240 Hz or 480 Hz), the length of each image stabilization period is shorter; however, in the same time period, the liquid crystal display will output more images under a higher refresh rate. Therefore, the image output periods corresponding to the secondary images may be utilized for providing stabilized images and opening the first shutter lens 102/the second shutter lens 104 in order to provide stereo images for the user. In brief, each primary image (e.g., L1, L2, R1 or R2 described above) may be responsible for updating the content of the displayed former image (i.e., the content of the previous primary first image). Therefore, before the current primary image to be displayed has totally replaced the displayed previous image, the output result of the display screen 112 (e.g., an LCD panel) comprises part of the current primary image and part of the previous primary image within the image driving period corresponding to the primary image to be displayed. In addition, the following secondary images (e.g., L1', L2', R1', R2', L1'-L1''' or R1'-R1''') are responsible for stabilizing images in order to provide stereo images for the user through the pair of shutter glasses 100.

Besides, in another exemplary embodiment, the secondary first/second image itself is a continuous output result of the primary first/second image included in the same group of first/second images. That is, within the image driving period corresponding to the primary image, the display screen 112 successively sets pixels according to the display data, wherein pixels are driven line by line from the top to the bottom in an image and pixel by pixel from the left to the right in each line of the image to thereby output the primary image to be displayed. Alternatively, according to a different placement setting or hardware design of the LCD panel, the display screen 112 may output the primary image to be displayed by successively setting pixels according to the display data, wherein the pixels are driven line by line from the bottom to the top in an image and pixel by pixel from the right to the left in each line of the image, or may be driven according to other pixel updating order (e.g., the LCD panel is divided into several display areas, and each display area has its own pixel updating order), thereby outputting the primary image to be displayed. However, within the image driving period corresponding to the following secondary image, the display screen 112 does not perform display driving operation according to any display data, so the display screen 112 still continuously displays the content of primary image due to the inherent characteristic of the LCD panel. The same objective of stabilizing the image is achieved. Moreover, the secondary first image may also be a black image or an adjusted image that is generated by applying a fine-tuning adjustment, such as a compensation for the crosstalk of images, to the primary first image included in the same group of first images. The same objective of stabilizing the image is achieved.

Besides, in yet another exemplary embodiment, the primary first/second image may be a black image, and the backlight module 114 stays in the on-state within the image output period corresponding to the secondary first/second image in order to provide stereo images for the user.

As described above, the control circuit 106 controls the first shutter lens 102 to be switched between an on-state ("ON") and an off-state ("OFF"), and controls the second shutter lens 104 to be switched between an on-state ("ON") and an off-state ("OFF"). In this exemplary embodiment, the control circuit 106 controls the first shutter lens 102 to stay in the on-state within two first image output periods (e.g., T11' and T12') corresponding to two specific secondary first images (e.g., L1 and L2) following two successive specific primary first images. For example, the first shutter lens 102 is switched from the off-state to the on-state at the start point of the image driving period TP1', and is switched from the on-state to the off-state at the end point of the image driving period TP1'. However, it is only used as an example. In another exemplary embodiment, the first shutter lens 102 may switch from the off-state to the on-state before the start point of the image driving period TP1, and switch from the on-state to the off-state after the end point of the image driving period TP1'. That is, the shutter-on period in which the first shutter lens 102 stays in the on-state may cover and extend beyond the image driving period. Besides, the control circuit 106 controls the first shutter lens 102 to open once more (i.e., switch from the on-state to the off-state and then switch from the off-state back to the on-state) within a first time interval (e.g., P1) between the two first image output periods.

Similarly, the control circuit 106 controls the second shutter lens 104 to stay in the on-state within two second image output periods (e.g., T21' and T22') corresponding to two specific secondary first images (e.g., R1' and R2') following two successive specific primary second images (e.g., R1 and R2). For example, the second shutter lens 104 is switched from the off-state to the on-state at the start point of the image driving period TP2', and is switched from the on-state to the off-state at the end point of the image driving periodvTP2'. However, it is only used as an example. In another exemplary embodiment, the second shutter lens 104 may switch from the off-state to the on-state before the start point of the image driving period TP2, and switch from the on-state to the off-state after the end point of the image driving period TP2'. That is, the shutter-on period in which the second shutter lens 104 stays in the on-state may cover and extend beyond the image driving period. Besides, the control circuit 106 further controls the second shutter lens 104 to open once more (i.e., switch from the on-state to the off-state and then switch from the off-state back to the on-state) within a second time interval (e.g., P1') between the two first image output periods.

In other words, according to the operating sequence shown in FIG. 11, the control circuit 106 controls the first shutter lens 102 to stay in the on-state within two first image output periods (e.g., T11' and T12') respectively corresponding to two successive specific primary first images (e.g., L1 and L2), and controls the second shutter lens 104 to stay in the on-state within a second image driving period (e.g., T21') corresponding to a specific secondary second image (e.g., R1') between the two specific secondary first images; and the control circuit 106 further controls the first shutter lens 102 and the second shutter lens 104 to simultaneously stay in the off-state only within several discontinuous time periods of a time interval (e.g., the time interval between T11' and T12') between the second image driving period corresponding to the specific secondary second image and a first image driving period corresponding to one of the two specific secondary first images.

Please note that FIG. 11 only shows the control circuit 106 controls the first shutter lens 102 and the second shutter lens 104 during an operating time period including, for example, image output periods T11-T22'. In fact, the control circuit 106 will repeat the same control mechanism mentioned above to control the first shutter lens 102 and the second shutter lens 104 to be switched between the on-state and the off-state by referring to the same glasses cycle (i.e., the cycle that left eye and right eye respectively view the image once) or different glasses cycles during the previous operating period(s) (e.g., the image output period before the image output period T11) and the following operating period(s) (e.g., the image output period following the image output period T22').

Figure 12:
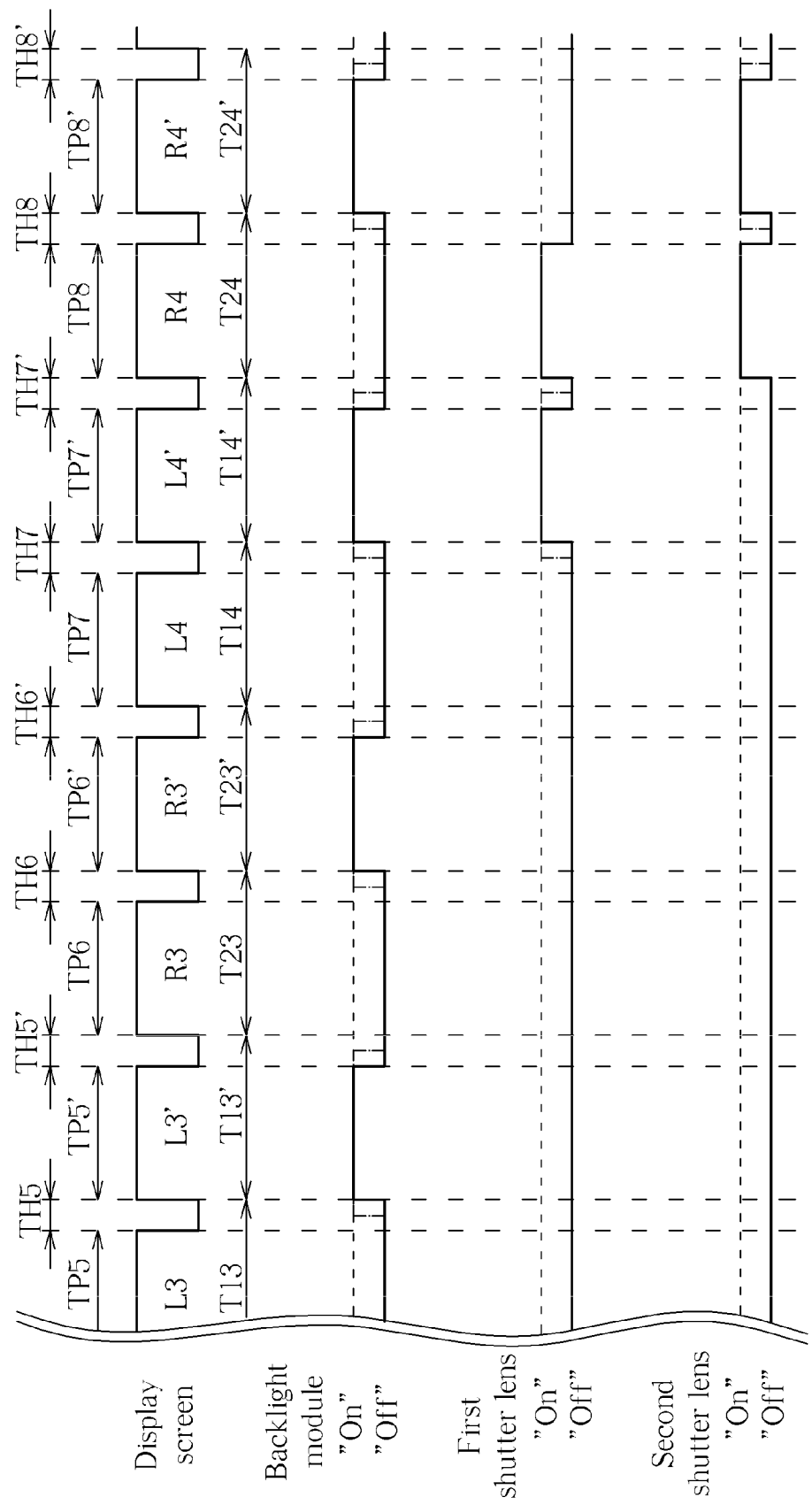
FIG. 12 is a continued sequence diagram of the operation shown in FIG. 11 based on a concept of using mixed different glasses cycles.
Figure 13:
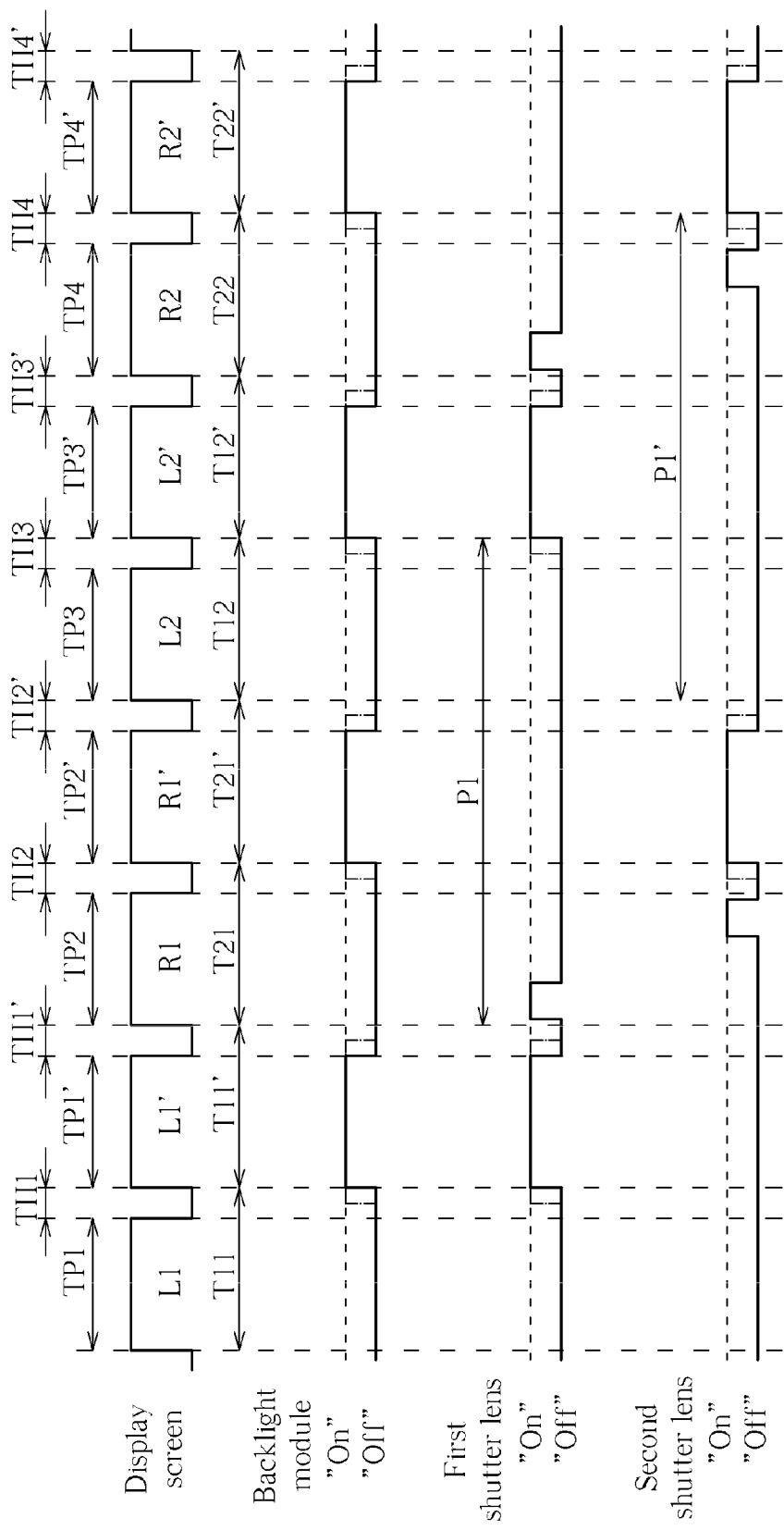
FIG. 13 is a sequence diagram of the tenth control method employed for controlling the pair of shutter glasses shown in FIG. 1.
Figure 14:
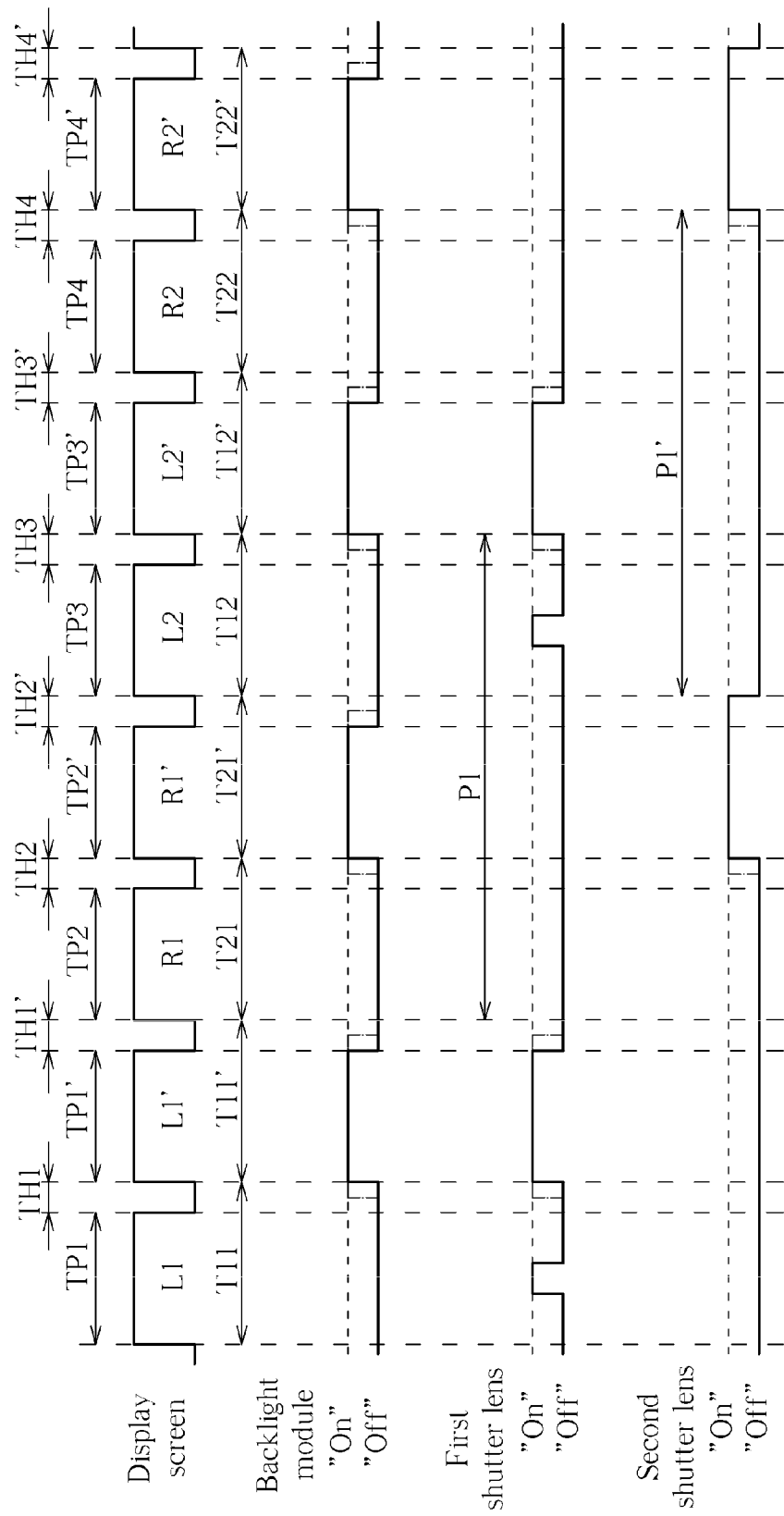
FIG. 14 is a sequence diagram of the eleventh control method employed for controlling the pair of shutter glasses shown in FIG. 1.
Figure 15:
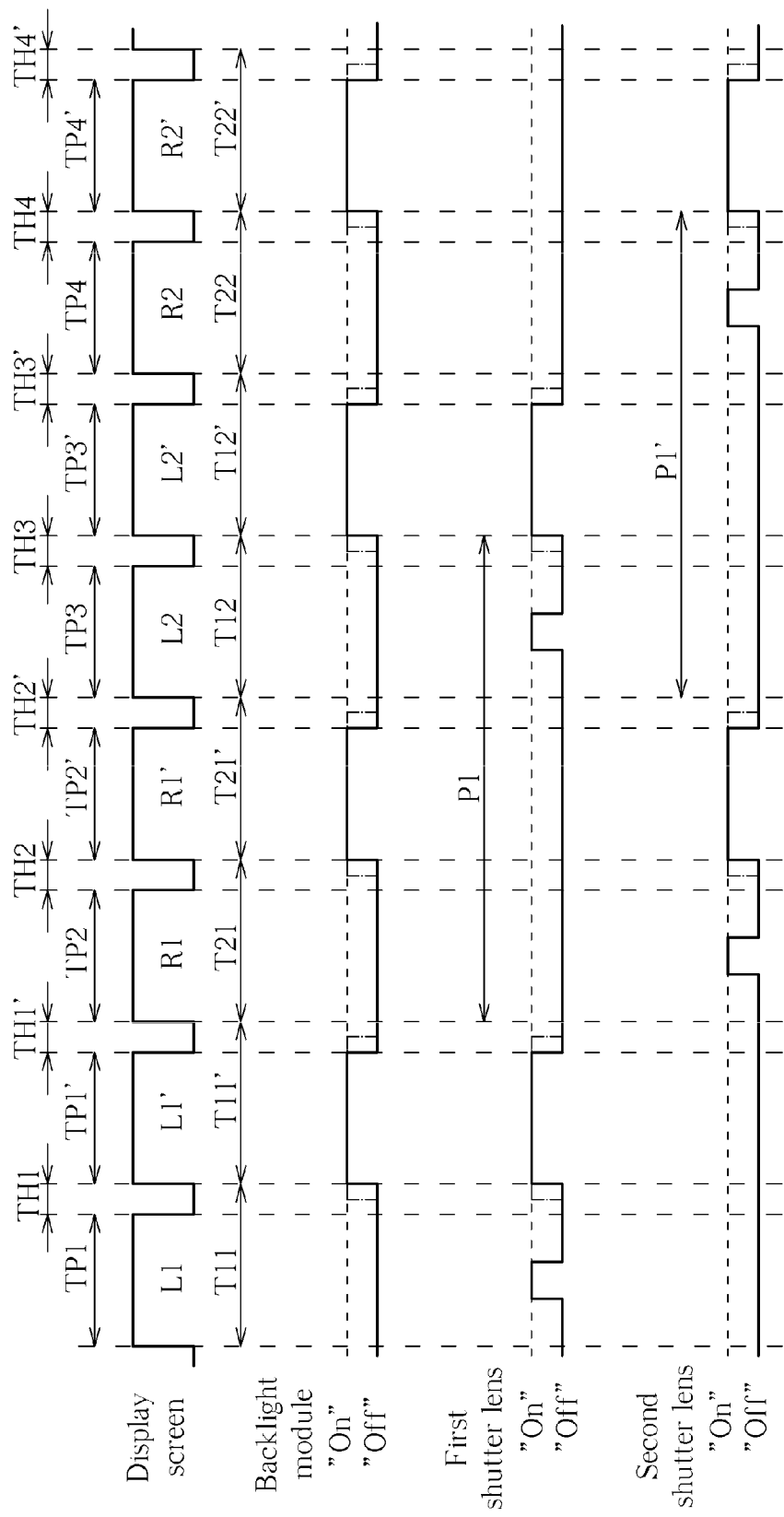
FIG. 15 is a sequence diagram of the twelfth control method employed for controlling the pair of shutter glasses shown in FIG. 1.
Figure 16:
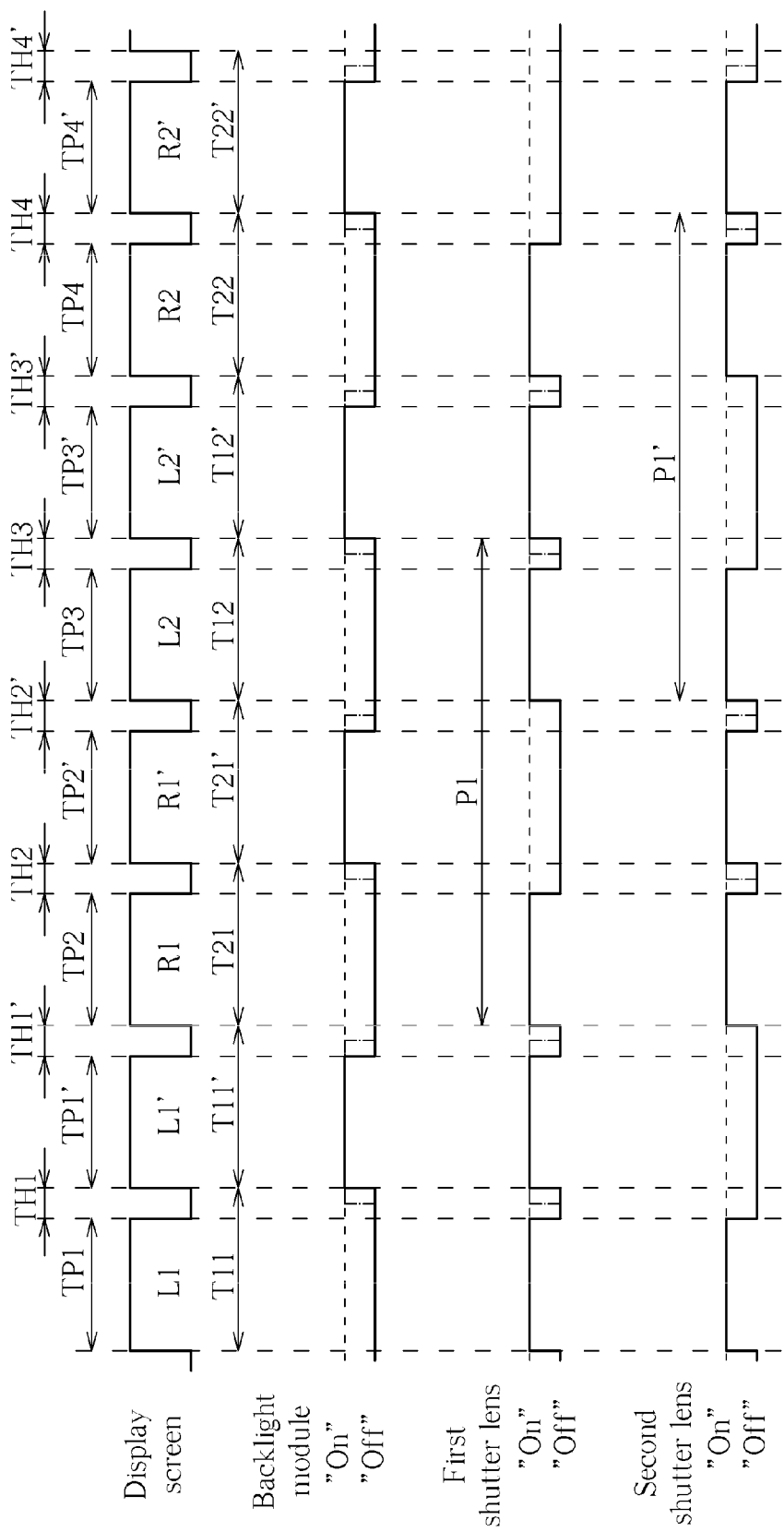
FIG. 16 is a sequence diagram of the thirteenth control method employed for controlling the pair of shutter glasses shown in FIG. 1.

As to the operation with mixed glasses cycles, please refer to FIG. 11 in conjunction with FIG. 12. FIG. 12 is a continued sequence diagram of the operation in FIG. 11 based on the concept of using mixed glasses cycles. As shown in FIG. 11, the original glasses cycle is equal to a sum of image output periods of four images (e.g., T11+T11'+T21+T421'). After the end of the second image output period T21', the glasses cycle is expanded to a sum of image output periods of eight images (e.g., T12+T12'+T22+T22'+T13+T13'+T23+T23'). In the present exemplary embodiment, the first shutter lens 102 is switched from the off-state to the on-state at the start point of the first image output period T14' corresponding to the secondary first image L4', and the second shutter lens 104 is switched from the off-state to the on-state at the start point of the second image output period T24 corresponding to the following primary second image R4. Please note that using a sum of image output periods of eight images as another glasses cycle is for illustrative purposes only, and is not meant to be a limitation of the present invention. In fact, the number of image output periods covered in one glasses cycle may be adjusted according to the actual application requirement/consideration.

Please note that, in another exemplary embodiment, the backlight module 114 is enabled to stay in the on-state within the image driving periods TP1', TP2', TP3', and Tp4' respectively corresponding to the secondary first image and secondary second image; additionally, the backlight-on periods of the backlight module 114 may also slightly expand forward/backward from the start point of the image driving period TP1', TP2', TP3', TP4' respectively corresponding to the secondary first image and the secondary second image, and/or slightly expand forward/backward from the end point of the image driving period TP1', TP2', TP3', TP4' respectively corresponding to the secondary first image and the secondary second image. In other words, the backlight module 114 is allowed to be switched from the off-state to the on-state before the start point of the image driving period corresponding to the secondary first/second image, and/or switch from the on-state back to the off-state after the end point of the image driving period corresponding to the secondary first/second image. That is, the backlight-on period of the backlight module 114 in the on-state may cover and extend beyond the image driving period corresponding to the secondary first/second image. The backlight module 114 stays in the on-state within the image driving period corresponding to the secondary first/second image, and stays in the off-state within the following image stabilization period, where a length in which backlight module 114 stays in the off-state within the image stabilization period is shorter than or equal to a length of the following image stabilization period.

According to the shutter lens control mechanism employed in a condition where the video output apparatus 110 is operated under a lower refresh rate (e.g., 60 Hz or 120 Hz), a variety of alternative designs, as shown in FIG. 4-FIG. 10, are feasible without departing from the spirit of the present invention. Similarly, as to the shutter lens control mechanism employed in another condition where the video output apparatus 110 is operated under a higher refresh rate (e.g., 240 Hz or 480 Hz), other alternative designs obeying the spirit of the present invention are feasible, as shown in FIG. 13-FIG. 16 which are sequence diagrams of the tenth control method—the thirteenth control method employed for controlling the pair of shutter glasses, respectively. Since those skilled in the art will readily know the operations of the exemplary embodiments shown in FIG. 13-FIG. 16 by reading above paragraphs and referring to pertinent figures such as FIG. 4-FIG. 6 and related specification description, further description is omitted here for brevity.

Similarly, within the image output periods (e.g., T11', T21', T12', and T22') respectively corresponding to the secondary first image and the secondary second image, the user is allowed to view images mainly by enabling the backlight module 114, while in the shutter-on periods, the liquid crystal cells in the liquid crystal layer of the first shutter lens 102/the second shutter lens 104 rotate before the image output period corresponding to the secondary first image/secondary second image in order to make the first shutter lens 102/the second shutter lens 104 switch from the off-state to the on-state, and rotate after the image output period corresponding to the secondary first image/secondary second image in order to make the first shutter lens 102/the second shutter lens 104 switch from the on-state to the off-state. Therefore, when the user is viewing images within the image output periods respectively corresponding to the secondary first image and the secondary second image, the present invention may further decrease the brightness attenuation resulted from the response time (i.e., the process of rotating) of the liquid crystal cells.

In order to maintain the same brightness user's left eye and right eye feel, in the exemplary embodiment, the ratio of the shutter-on period in which the first shutter lens 102 stays in the on-state and to the shutter-off period in which the first shutter lens 102 stays in the off-state is substantially equal to the ratio of the shutter-on period in which the second shutter lens 104 stays in the on-state to the shutter-off period in which the second shutter lens 104 stays in the off-state. In other words, in the process that each of the first shutter lens 102 and the second shutter lens 104 continuously is switched between the on-state and the off-state, a total length of shutter-on periods that the first shutter lens 102 stays in the on-state is substantially equal to a total length of shutter-on periods that the second shutter lens 104 stays in the on-state. In other words, a total length of shutter-off periods that the first shutter lens 102 stays in the off-state is substantially equal to a total length of shutter-off periods that the second shutter lens 104 stays in the off-state. Since the lengths of integral shutter-on/shutter-off periods that the first shutter lens 102 and the second shutter lens 104 stay in the on/off-state are identical to each other, user's left eye and right eye would feel the same brightness. However, this is for illustrative purposes only, and is not meant to be a limitation of the present invention. For example, under the condition where the length of an integral shutter-on/shutter-off period of the first shutter lens 102 is equal to the length of an integral shutter-on/shutter-off period of the second shutter lens 104, the number of the shutter-on times and the number of the shutter-off times of the first shutter lens 102 are not required to be equal to the number of the shutter-on times and the number of the shutter-off times of the second shutter lens 104, respectively.

Besides, switching on and switching off the first shutter lens 102 and the second shutter lens 104 will determine the brightness perceived by the user. Therefore, under the premise of increasing the shutter-on periods of shutter glasses, the number of shutter-on times, the number of shutter-off times, the ratio of shutter-on period to the shutter-off period and/or the glasses cycle (i.e., the cycle that the left eye and the right eye respectively view the image once) of the first shutter lens 102 and the second shutter lens 104 are adjustable, thereby achieving the objective of adjusting the ambient brightness perceived by the user.

Please note that, as to the video output apparatus 110 that is operated under a lower refresh rate (e.g., 120 Hz) in the exemplary embodiment described above, a glasses cycle (i.e., the cycle that the left eye and the right eye respectively view the image once) is composed of image output periods of two images. As to the video output apparatus 110 that is operated under a higher refresh rate (e.g., 240 Hz) in the exemplary embodiment described above, a glasses cycle (i.e., the cycle that the left eye and the right eye respectively view the image once) is composed of image output periods of four images. However, this is for illustrative purposes only, and is not meant to be a limitation of the present invention. For example, regarding the video output apparatus 110 that is operated under a lower refresh rate (e.g., 120 Hz), a glasses cycle can also be composed of image output periods of four or six images. In addition, one of the several control methods described above or their combination may be employed to control the pair of shutter glasses 100. The same objective of increasing the shutter-on periods of the pair of shutter glasses is achieved. In brief, the periodicity of the pair of shutter glasses 100 does not necessarily the same as the periodicity of image signals.

Moreover, in the present invention, the on-state and the off-state of the backlight module 114 are not limited to fully switching on the backlight module 114 to make the backlight module 114 have 100% brightness output and fully switching off the backlight module 114 to make the backlight module 114 have 0% brightness output, respectively. For example, when the brightness output of the backlight module 114 is higher than a certain value such as 80% light output, the backlight module 114 may be regarded as staying in the on-state; besides, when the brightness output of the backlight module 114 is lower than a certain value such as 20% light output, the backlight module 114 may be regarded as staying in the off-state. In brief, the on-state and the off-state of the backlight module 114 may be determined according to the actual design requirement/consideration.

Those skilled in the art will readily observe that numerous modifications and alterations of the device and method may be made while retaining the teachings of the invention.

What is claimed is:

1. A method for controlling a pair of shutter glasses utilized for viewing stereo images presented by a video output apparatus, the video output apparatus respectively outputting a first image and a second image during a plurality of image output periods, alternately, one of the first image and the second image being a left-eye image, the other one of the first image and the second image being a right-eye image, each image output period comprising an image driving period and an image stabilization period, the method comprising:
   controlling a first shutter lens of the pair of shutter glasses to be switched between an on-state and an off-state, wherein the first shutter lens stays in the on-state within two image stabilization periods respectively corresponding to two successive specific first images, and is switched from the off-state to the on-state and then switched from the on-state to the off-state for at least once during a first time interval between the two image stabilization periods respectively corresponding to the two successive specific first images; and
   controlling a second shutter lens of the pair of shutter glasses to be switched between the on-state and the off-state;
   wherein one of the first shutter lens and the second shutter lens is utilized for viewing left-eye images, and the other one of the first shutter lens and the second shutter lens is utilized for viewing right-eye images.

2. The method of claim 1, wherein the second shutter lens stays in the on-state within two image stabilization periods respectively corresponding to two successive specific second images, and is switched from the off-state to the on-state and then switched from the on-state to the off-state for at least once during a second time interval between the two image stabilization periods respectively corresponding to the two successive specific second images.

3. The method of claim 2, wherein one of the two successive specific second images is between the two successive specific first images, and a shutter-on period of the first shutter lens staying in the on-state during the first time interval is at least partly overlapped with a shutter-on period of the second shutter lens staying in the on-state during the second time interval.

4. The method of claim 2, wherein one of the two successive specific second images is between the two successive specific first images, and a shutter-on period of the first shutter lens staying in the on-state during the first time interval is not overlapped with a shutter-on period of the second shutter lens staying in the on-state during the second time interval.

5. The method of claim 1, wherein the second shutter lens stays in the on-state within an image stabilization period corresponding to a specific second image between the two successive specific first images; and the first shutter lens and the second shutter lens simultaneously stay in the off-state within a plurality of discontinuous time periods included in a time interval between the image stabilization period corresponding to the specific second image and an image stabilization period corresponding to one of the two successive specific first images.

6. A pair of shutter glasses utilized for viewing stereo images presented by a video output apparatus, the video output apparatus respectively outputting a first image and a second during a plurality of image output periods, alternately, one of the first image and the second image being a left-eye image, the other one of the first image and the second image being a right-eye image, each image output period comprising an image driving period and an image stabilization period, the pair of shutter glasses comprising:
   a first shutter lens;
   a second shutter lens, wherein one of the first shutter lens and the second shutter lens is utilized for viewing left-eye images, and the other one of the first shutter lens and the second shutter lens is utilized for viewing right-eye images; and
   a control circuit, electronically connected to the first shutter lens and the second shutter lens, arranged for controlling the first shutter lens to be switched between an on-state and an off-state, and controlling the second shutter lens to be switched between the on-state and the off-state;
   wherein the control circuit controls the first shutter lens to stay in the on-state within two image stabilization period respectively corresponding to two successive specific first images, and controls the first shutter lens to be switched from the off-state to the on-state and then switch from the on-state to the off-state for at least once during a first time interval between the two image stabilization periods respectively corresponding to the two successive specific first images.

7. The pair of shutter glasses of claim 6, wherein the control circuit is arranged for controlling the second shutter lens to stay in the on-state within two image stabilization periods respectively corresponding to two successive specific second images, and controlling the second shutter lens to be switched from the off-state to the on-state and then switch from the on-state to the off-state for at least once during a second time interval between the two image stabilization periods respectively corresponding to the two successive specific second images.

8. The pair of shutter glasses of claim 7, wherein one of the two successive specific second images is between the two successive specific first images, and a shutter-on period of the first shutter lens staying in the on-state during the first time interval is at least partly overlapped with a shutter-on period of the second shutter lens staying in the on-state during the second time interval.

9. The pair of shutter glasses of claim 7, wherein one of the two successive specific second images is between the two successive specific first images, and a shutter-on period of the first shutter lens staying in the on-state during the first time interval is not overlapped with a shutter-on period of the second shutter lens staying in the on-state during the second time interval.

10. The pair of shutter glasses of claim 6, wherein the control circuit is arranged for controlling the second shutter lens to stay in the on-state within an image stabilization period corresponding to a specific second image between the two successive specific first images, and the control circuit controls the first shutter lens and the second shutter lens to simultaneously stay in the off-state within a plurality of discontinuous time periods included in a time interval between the image stabilization period corresponding to the specific second image and an image stabilization period corresponding to one of the successive specific first images.

11. A method for controlling a pair of shutter glasses utilized for viewing stereo images presented by a video output apparatus, the video output apparatus outputting a group of first images and a group of second images, alternately, the video output apparatus successively outputting a primary first image and at least a secondary first image, included in the group of first images in order, within a plurality of successive first image output periods, the video output apparatus successively outputting a primary second image and at least a secondary second image, included in the group of second images in order, within a plurality of successive second image output periods, one of the group of first images and the group of the second images being a group of left-eye images, the other of the group of first images and the group of second images being a group of right-eye images, the method comprising:
controlling a first shutter lens of the pair of shutter glasses to be switched between an on-state and an off-state, wherein the first shutter lens stays in the on-state within two first image output periods respectively corresponding to two specific secondary first images following two successive specific primary first images respectively, and the first shutter lens is switched from the off-state to the on-state and then switched from the on-state to the off-state for at least once during a first time interval between the two first image output periods; and
controlling a second shutter lens of the pair of shutter glasses to be switched between the on-state and the off-state;
wherein one of the first shutter lens and the second shutter lens is utilized for viewing left-eye images, and the other one of the first shutter lens and the second lens is utilized for viewing right-eye images.

12. The method of claim 11, wherein the second shutter lens stays in the on-state within two second image output periods respectively corresponding to two specific secondary second images following two successive specific primary second images respectively, and is switched from the off-state to the on-state and then switched from the on-state to the off-state for at least once within a second time interval between the two second image output periods.

13. The method of claim 12, wherein one of the two specific secondary second images is between the two specific secondary first images, and a shutter-on period of the first shutter lens staying in the on-state during the first time interval is at least partly overlapped with a shutter-on period of the second shutter lens staying in the on-state during the second time interval.

14. The method of claim 12, wherein one of the two specific secondary second images is between the two specific secondary first images, and a shutter-on period of the first shutter lens staying in the on-state during the first time interval is not overlapped with a shutter-on period of the second shutter lens staying in the on-state during the second time interval.

15. The method of claim 11, wherein the second shutter lens stays in the on-state within a second image output period corresponding to a specific secondary second image between the two specific secondary first images; and the first shutter lens and the second shutter lens simultaneously stay in the off-state within a plurality of discontinuous time periods included in a time interval between the second image output period corresponding to the specific secondary second image and a first image output period corresponding to one of the two specific secondary first images.

16. A pair of shutter glasses utilized for viewing stereo images presented by a video output apparatus, the video output apparatus outputting a group of first images and a group of second images, alternately, the video output apparatus successively outputting a primary first image and at least a secondary first image, included in the group of first images in order, within a plurality of successive first image output periods, the video output apparatus successively outputting a primary second image and at least a secondary second image, included in the group of second images in order, within a plurality of successive second image output periods, one of the group of first images and the group of second images being a group of left-eye images, the other of the group of first images and the group of second images being a group of right-eye images, the shutter glasses comprising:
a first shutter lens;
a second shutter lens, wherein one of the first shutter lens and the second shutter lens is utilized for viewing left-eye images, and the other one of the first shutter lens and the second shutter lens is utilized for viewing right-eye images; and
a control circuit, electronically connected to the first shutter lens and the second shutter lens, for controlling the first shutter lens to be switched between an on-state and an off-state, and controlling the second shutter lens to be switched between the on-state and the off-state;
wherein the control circuit controls the first shutter lens to stay in the on-state within two first image output periods respectively corresponding to two specific secondary first images following two successive specific primary first images respectively, and controls the first shutter lens to be switched from the off-state to the on-state and then switch from the on-state to the off-state for at least once during a first time interval between the two first image output periods.

17. The pair of shutter glasses of claim 16, wherein the control circuit controls the second shutter lens to stay in the on-state within two second image output periods respectively corresponding to two specific secondary second images following two successive specific primary second images respectively, and controls the first shutter lens to be switched from the off-state to the on-state and then switch from the on-state to the off-state for at least once during a second time interval between the two second image output periods.

18. The pair of shutter glasses of claim 17, wherein one of the two specific secondary second images is between the two specific secondary first images, and a shutter-on period of the first shutter lens staying in the on-state during the first time interval is at least partly overlapped with a shutter-on period of the second shutter lens staying in the on-state during the second time interval.

19. The pair of shutter glasses of claim 17, wherein one of the two specific secondary second images is between the two specific secondary first images, and a shutter-on period of the first shutter lens staying in the on-state during the first time interval is not overlapped with a shutter-on period of the second shutter lens staying in the on-state during the second time interval.

20. The pair of shutter glasses of claim 16, wherein the control circuit controls the second shutter lens to stay in the on-state within a second image output period corresponding to a specific secondary second image between the two specific secondary first images; and the first shutter lens and the second shutter lens simultaneously stay in the off-state within a plurality of discontinuous time periods included in a time interval between the second image output period corresponding to the specific secondary second image and a first image output period corresponding to one of the two specific secondary first images.

\* \* \* \* \*